(12) United States Patent
Bang et al.

(10) Patent No.: US 9,612,469 B2
(45) Date of Patent: Apr. 4, 2017

(54) DISPLAY DEVICE COMPRISING A PLURALITY OF MICROCAVITIES HAVING A HORIZONTAL WIDTH THAT IS GRADUALLY DECREASED ACCORDING TO AN INCREASE IN A DISTANCE FROM A CENTER

(71) Applicant: Samsung Display Co., Ltd., Yongin, Gyeonggi-Do (KR)

(72) Inventors: Jung Suk Bang, Seoul (KR); Dae Ho Song, Hwaseong-si (KR); Seok-Joon Hong, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 198 days.

(21) Appl. No.: 14/472,146

(22) Filed: Aug. 28, 2014

(65) Prior Publication Data
US 2015/0226998 A1 Aug. 13, 2015

(30) Foreign Application Priority Data
Feb. 12, 2014 (KR) .......................... 10-2014-0016045

(51) Int. Cl.
*G02F 1/1333* (2006.01)
*G02F 1/1341* (2006.01)

(52) U.S. Cl.
CPC .............................. *G02F 1/133377* (2013.01)

(58) Field of Classification Search
CPC .......................... G02F 1/133377; G02F 1/1341
See application file for complete search history.

(56) References Cited

U.S. PATENT DOCUMENTS

| | | | | |
|---|---|---|---|---|
| 5,986,729 A | * | 11/1999 | Yamanaka | ............. G02F 1/1333 349/153 |
| 2012/0062448 A1 | * | 3/2012 | Kim | ................... G02F 1/133377 345/55 |
| 2015/0116619 A1 | * | 4/2015 | Yi | ....................... G02B 27/2214 349/43 |

FOREIGN PATENT DOCUMENTS

KR 10-2014-0025739 3/2014

* cited by examiner

*Primary Examiner* — Paul Lee
(74) *Attorney, Agent, or Firm* — Innovation Counsel LLP

(57) ABSTRACT

Provided is a display device, including a substrate including pixel areas which are disposed in a matrix form including pixel rows and pixel columns, a thin film transistor formed on the substrate, a pixel electrode connected to the thin film transistor, a common electrode formed on the pixel electrode to be spaced apart from the pixel electrode with a microcavity therebetween, a liquid crystal layer filling the microcavity between the pixel electrode and the common electrode, a roof layer formed on the common electrode, a liquid crystal injection hole formed in the common electrode and the roof layer to expose a part of the microcavity, and an overcoat formed on the roof layer so as to cover the liquid crystal injection hole to seal the microcavity. A cross section of the microcavity has a reverse-tapered trapezoidal shape in which an upper width is larger than a lower width.

3 Claims, 28 Drawing Sheets

FIG. 28
(a)
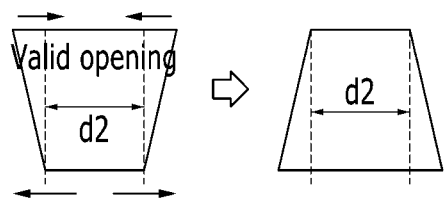
(b)
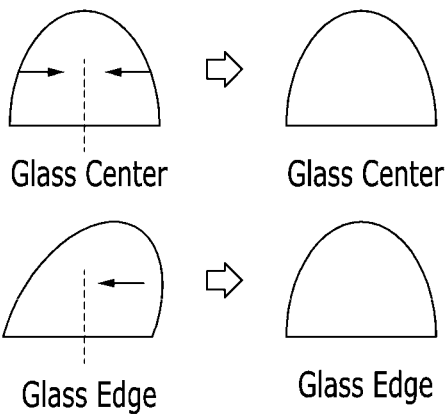
(c)
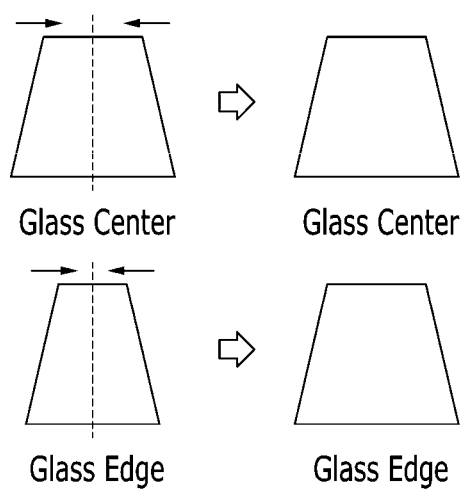

DISPLAY DEVICE COMPRISING A PLURALITY OF MICROCAVITIES HAVING A HORIZONTAL WIDTH THAT IS GRADUALLY DECREASED ACCORDING TO AN INCREASE IN A DISTANCE FROM A CENTER

CROSS-REFERENCE TO RELATED APPLICATION

This application claims priority to and the benefit of Korean Patent Application No. 10-2014-0016045 filed in the Korean Intellectual Property Office on Feb. 12, 2014, the entire contents of which are incorporated herein by reference.

BACKGROUND (a) Field

The inventive concept relates to a display device and a manufacturing method thereof.

(b) Description of the Related Art

The liquid crystal display which is one of the most common types of flat panel displays currently in use includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images.

Two sheets of display panels configuring the liquid crystal display may include a thin film transistor array panel and an opposing display panel. In the thin film transistor array panel, a gate line transferring a gate signal and a data line transferring a data signal are formed to cross each other, and a thin film transistor connected with the gate line and the data line, a pixel electrode connected with the thin film transistor, and the like may be formed. In the opposing display panel, a light blocking member, a color filter, a common electrode, and the like may be formed. In some cases, the light blocking member, the color filter, and the common electrode may be formed on the thin film transistor array panel.

However, in a liquid crystal display in the related art, two sheets of substrates are necessarily used, and respective constituent elements are formed on the two sheets of substrates, and as a result, there are problems in that the display device is heavy and thick, has high cost, and has a long processing time.

The above information disclosed in this Background section is only for enhancement of understanding of the background of the invention and therefore it may contain information that does not form the prior art.

SUMMARY

The inventive concept has been made in an effort to provide a display device and a manufacturing method thereof having advantages of reducing a weight, a thickness, cost, and a processing time by manufacturing the display device by using one substrate.

Further, the inventive concept has been made in an effort to provide a display device having advantages of solving a problem that deformation of a microcavity occurs when the display device is bent, and maintaining display quality even in the case where the display device is bent.

An exemplary embodiment of the inventive concept provides a display device, including: a substrate including a plurality of pixel areas which are disposed in a matrix form including a plurality of pixel rows and a plurality of pixel columns; a thin film transistor formed on the substrate; a pixel electrode connected to the thin film transistor and formed in the pixel area; a common electrode formed on the pixel electrode to be spaced apart from the pixel electrode with a microcavity therebetween; a liquid crystal layer filling the microcavity between the pixel electrode and the common electrode; a roof layer formed on the common electrode; a liquid crystal injection hole formed in the common electrode and the roof layer to expose a part of the microcavity; and an overcoat formed on the roof layer so as to cover the liquid crystal injection hole to seal the microcavity, in which a cross section of the microcavity has a reverse-tapered trapezoidal shape in which an upper width is larger than a lower width.

The pixel electrode includes a first subpixel electrode and a second subpixel electrode, a first valley is disposed between the first subpixel electrode and the second subpixel electrode in a pixel row direction, a second valley is disposed between the plurality of pixel columns, and the microcavity exists in a region partitioned by the first valley and the second valley.

A cross section of the liquid crystal layer may have a reversed trapezoidal shape in which an upper side is larger than a lower side.

A horizontal width of the microcavity may be gradually decreased according to an increase in a distance from a center of a display panel.

The cross section may be a cross section along the pixel rows.

The display device may be a horizontally curved display.

Another exemplary embodiment of the inventive concept provides a manufacturing method of a display device, including: forming a thin film transistor on a substrate; forming a first insulating layer on the thin film transistor; forming a pixel electrode connected with the thin film transistor on the first insulating layer; forming a trapezoid pattern between adjacent pixel electrodes; forming a reverse-tapered trapezoidal sacrificial layer filling a space between the patterns on the pixel electrode; removing the trapezoid pattern; forming a common electrode on the sacrificial layer; forming a second insulating layer on the common electrode; forming a roof layer by coating and patterning an organic material on the second insulating layer; forming a microcavity between the pixel electrode and the common electrode by removing the sacrificial layer; forming a liquid crystal layer by injecting a liquid crystal material into the microcavity; and forming an overcoat on the roof layer to seal the microcavity.

The forming of the trapezoid pattern between the adjacent pixel electrodes may include coating a pattern material on the entire substrate; and removing the pattern on the pixel electrode by applying a photolithography process to the pattern material.

The microcavity may have the same shape as the sacrificial layer, and have a reversed trapezoidal shape in which an upper side is larger than the lower side.

The trapezoid pattern may be a positive photo-resist and the reverse-tapered trapezoidal sacrificial layer may be a negative photo resist.

The manufacturing method of a display device may further include removing the sacrificial layer on the trapezoid pattern, and exposing the trapezoid pattern and the reverse-tapered trapezoidal sacrificial layer before removing the trapezoid pattern.

Still another exemplary embodiment of the inventive concept provides a display device, including: a substrate including a plurality of pixel areas which are disposed in a matrix form including a plurality of pixel rows and a plurality of pixel columns; a thin film transistor formed on the substrate; a pixel electrode connected to the thin film transistor and formed in the pixel area; a common electrode formed on the pixel electrode to be spaced apart from the pixel electrode with a microcavity therebetween; a roof layer formed on the common electrode; a liquid crystal injection hole formed in the common electrode and the roof layer to expose a part of the microcavity; a liquid crystal layer filling the microcavity; and an overcoat formed on the roof layer so as to cover the liquid crystal injection hole to seal the microcavity, in which a cross section of the microcavity has a symmetrical semi-oval shape in a pixel disposed at the center of the substrate, a cross section of the microcavity of a pixel disposed at the right of the substrate has an semi-oval shape in which a cross section of the microcavity has a symmetrical semi-oval shape in a pixel disposed at the center of the substrate, a cross section of the microcavity of a pixel disposed at the right side of the substrate has an semi-oval shape in which a semi-major axis is inclined to the right, and a cross section of the microcavity of a pixel disposed at the left side of the substrate has an semi-oval shape in which a semi-major axis is inclined to the left.

A right-inclined degree of a slope of the microcavity is gradually increased toward the right from the center of the substrate, and a left-inclined degree is increased toward the left from the center of the substrate.

The pixel electrode includes a first subpixel electrode and a second subpixel electrode, a first valley is disposed between the first subpixel electrode and the second subpixel electrode in a pixel row direction, a second valley is disposed between the plurality of pixel columns, the microcavity exists in a region partitioned by the first valley and the second valley, and the cross section in a pixel row direction of the microcavity is a semicircle, a right-inclined oval, or a left-inclined oval.

An inclination angle of the semi-major axis may be gradually increased according to an increase in a distance from a center of the substrate The display device may be a horizontally curved display.

Yet another exemplary embodiment of the inventive concept provides a manufacturing method of a display device, including: forming a thin film transistor on a substrate; forming a first insulating layer on the thin film transistor; forming a pixel electrode connected with the thin film transistor on the first insulating layer; coating a sacrificial layer on the pixel electrode; positioning a mask having different transmittance for each area on the sacrificial layer; exposing and etching the sacrificial layer; exposing and etching the sacrificial layer; forming a common electrode on the sacrificial layer; forming a second insulating layer on the common electrode; forming a roof layer by coating and patterning an organic material on the second insulating layer; forming a microcavity between the pixel electrode and the common electrode by removing the sacrificial layer; forming a liquid crystal layer by injecting a liquid crystal material into the microcavity; and forming an overcoat on the roof layer to seal the microcavity.

The mask corresponding to a center of the substrate has a same horizontal transmittance in a left and a right side of the semi-oval, and the mask except a region corresponding to the center of the substrate has a different horizontal transmittance in a left and a right side of the semi-oval.

The mask may be a halftone mask or a slit.

The sacrificial layer is a negative photosensitive material, the mask corresponding to the left side of the substrate has higher transmittance in the left side of the semi-oval than the right side of the semi-oval, and the mask corresponding to the right side of the substrate has higher transmittance in the right side of the semi-oval than the left side of the semi-oval.

Still yet another exemplary embodiment of the inventive concept provides a display device, including: a substrate including a plurality of pixel areas which are disposed in a matrix form with a plurality of pixel rows and a plurality of pixel columns; a thin film transistor formed on the substrate; a pixel electrode connected to the thin film transistor and formed in the pixel area; a common electrode formed on the pixel electrode to be spaced apart from the pixel electrode with a microcavity therebetween; a roof layer formed on the common electrode; a liquid crystal injection hole formed in the common electrode and the roof layer to expose a part of the microcavity; a liquid crystal layer filling the microcavity; and an overcoat formed on the roof layer so as to cover the liquid crystal injection hole to seal the microcavity, in which a horizontal width of the microcavity is gradually decreased according to an increase in a distance from a center of a display panel.

The pixel electrode may include a first subpixel electrode and a second subpixel electrode, a first valley may be disposed between the first subpixel electrode and the second subpixel electrode in a pixel row direction, a second valley may be disposed between the plurality of pixel columns, the microcavity may exist in a region partitioned by the first valley and the second valley, and the cross section in a pixel row direction of the microcavity may have a trapezoid shape in which an upper side is smaller than a lower side.

The display device may be a horizontally curved display.

A cross section in a pixel row direction of the microcavity may have a trapezoidal shape in which an upper width is smaller than a lower width.

Further exemplary embodiment of the inventive concept provides a manufacturing method of a display device, including: forming a thin film transistor on a substrate; forming a first insulating layer on the thin film transistor; forming a pixel electrode connected with the thin film transistor on the first insulating layer; coating a sacrificial layer on the pixel electrode; positioning a mask including light blocking regions, a width of the light blocking regions being gradually varying according to an increase in a distance from a center of the substrate; exposing and developing the sacrificial layer; forming a common electrode on the sacrificial layer; forming a second insulating layer on the common electrode; forming a roof layer by coating and patterning an organic material on the second insulating layer; forming a microcavity between the pixel electrode and the common electrode by removing the sacrificial layer; forming a liquid crystal layer by injecting a liquid crystal material into the microcavity; and forming an overcoat on the roof layer to seal the microcavity.

The sacrificial layer is a positive photosensitive material, and the width of the light blocking regions is gradually decreased according to an increase in a distance from a center of a display panel.

According to the exemplary embodiments of the inventive concept, it is possible to maintain display quality even in the case where the panel is bent, by forming a shape of the microcavity as a reverse trapezoid, or varying the shape of the microcavity at the center and the edge of one panel.

BRIEF DESCRIPTION OF THE DRAWINGS

FIG. 28 illustrates deformation of a microcavity due to a bending of a panel in a display device according to Example.

DETAILED DESCRIPTION OF THE EMBODIMENTS

Figure 1:
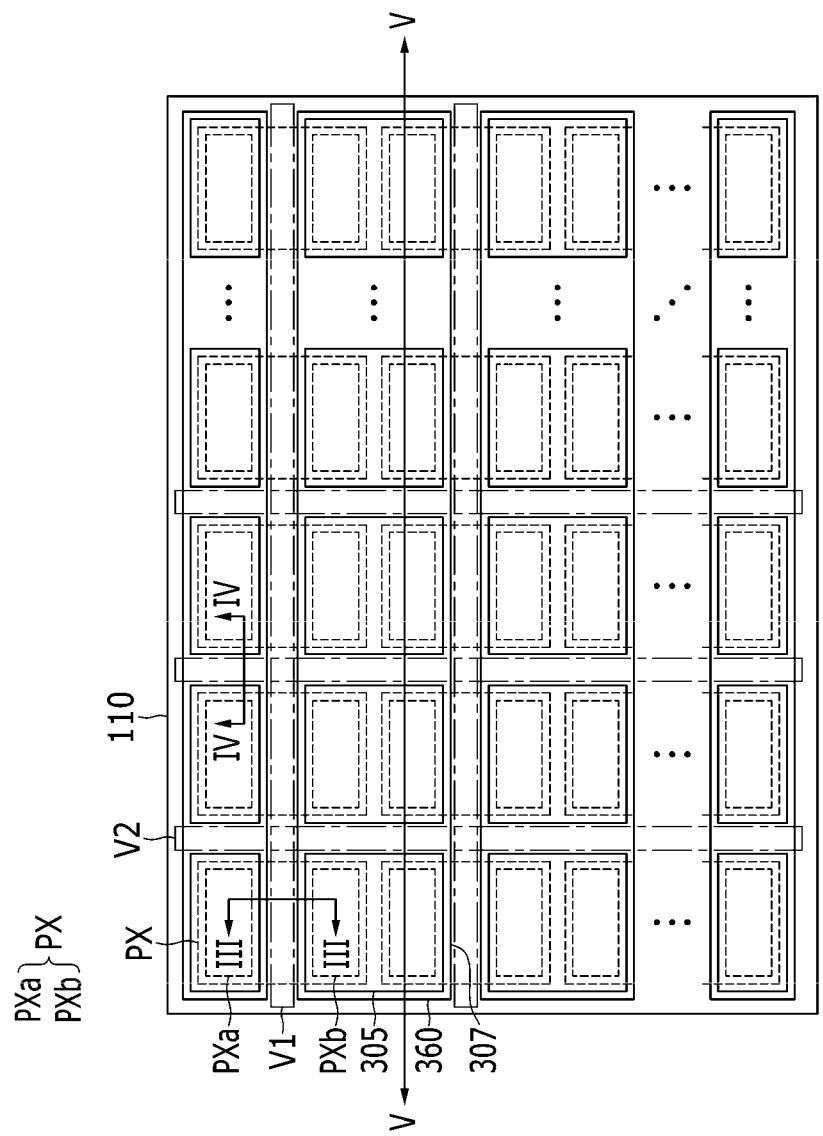
FIG. 1 is a plan view illustrating a display device according to an exemplary embodiment of the inventive concept.

The inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be formed directly on the other element or be formed with intervening elements. In contrast, when an element is referred to as being "directly on" another element, there are no intervening elements present.

First, a display device according to an exemplary embodiment of the inventive concept will be schematically described below with reference to the accompanying drawings.

FIG. 1 is a plan view illustrating a display device according to an exemplary embodiment of the inventive concept, and for convenience, FIG. 1 illustrates only some constituent elements.

A display device according to the exemplary embodiment of the inventive concept includes a substrate 110 made of a material such as glass or plastic, and a roof layer 360 formed on the substrate 110.

The substrate 110 includes a plurality of pixel areas PXs. The plurality of pixel areas PXs is disposed in a matrix form which includes a plurality of pixel rows and a plurality of pixel columns. Each pixel area PX may include a first subpixel area PXa and a second subpixel area PXb. The first subpixel area PXa and the second subpixel area PXb may be vertically disposed.

A first valley V1 is disposed between the first subpixel area PXa and the second subpixel area PXb along a pixel row direction, and a second valley V2 is disposed between a plurality of pixel columns.

The roof layer 360 is formed along a pixel row direction. In this case, the roof layer 360 is removed at the first valley V1 and thus an injection hole 307 is formed so that a constituent element disposed below the roof layer 360 is exposed to the outside.

Each roof layer 360 is formed to be separated from the substrate 110 between the adjacent second valleys V2 to form the microcavity 305. Further, each roof layer 360 is formed to be attached to the substrate 110 at the second valley V2 to cover both sides of the microcavity 305.

A structure of the display device according to the exemplary embodiment of the inventive concept described above is just an example and may be variously modified. For example, a layout form of the pixel area PX, the first valley V1, and the second valley V2 may be modified, and the plurality of roof layers 360 may be connected to each other at the first valley V1, and a part of each roof layer 360 is separated from the substrate 110 at the second valley V2 and thus the adjacent microcavities 305 may be connected to each other.

Next, one pixel of the display device according to the exemplary embodiment of the inventive concept will be described below with reference to FIGS. 1 to 4.

Figure 2:
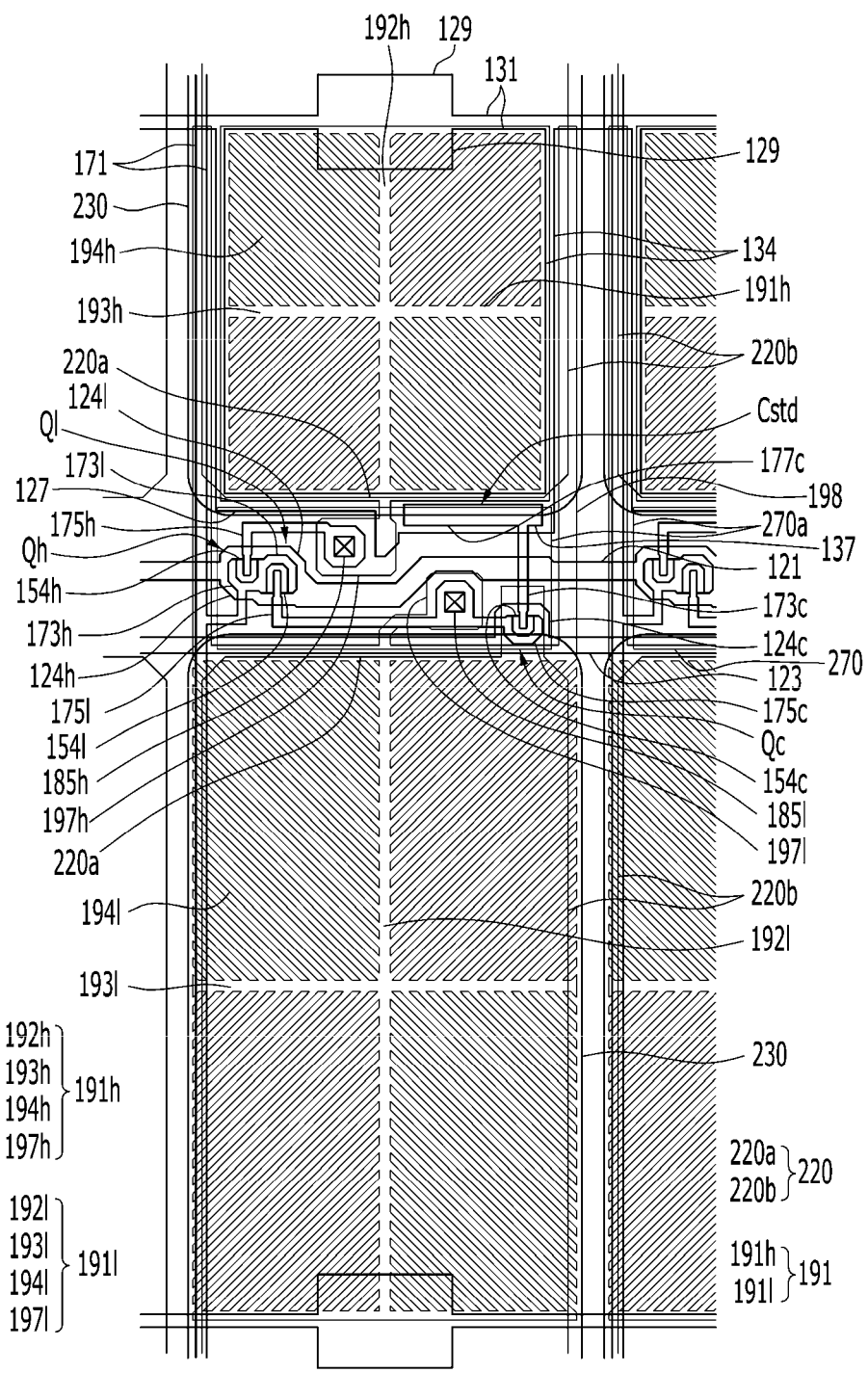
FIG. 2 is a plan view illustrating one pixel of the display device according to the exemplary embodiment of the inventive concept.
Figure 3:
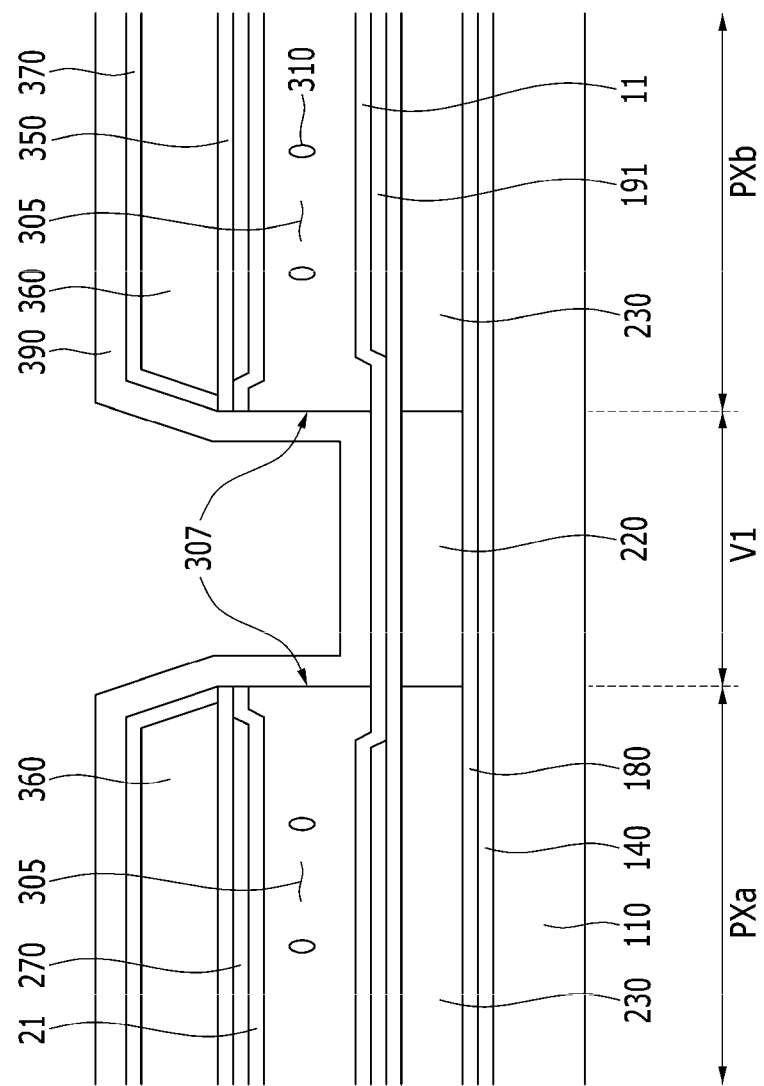
FIG. 3 is a cross-sectional view illustrating a part of the display device of FIG. 1 taken along line III-III according to the exemplary embodiment of the inventive concept.
Figure 4:
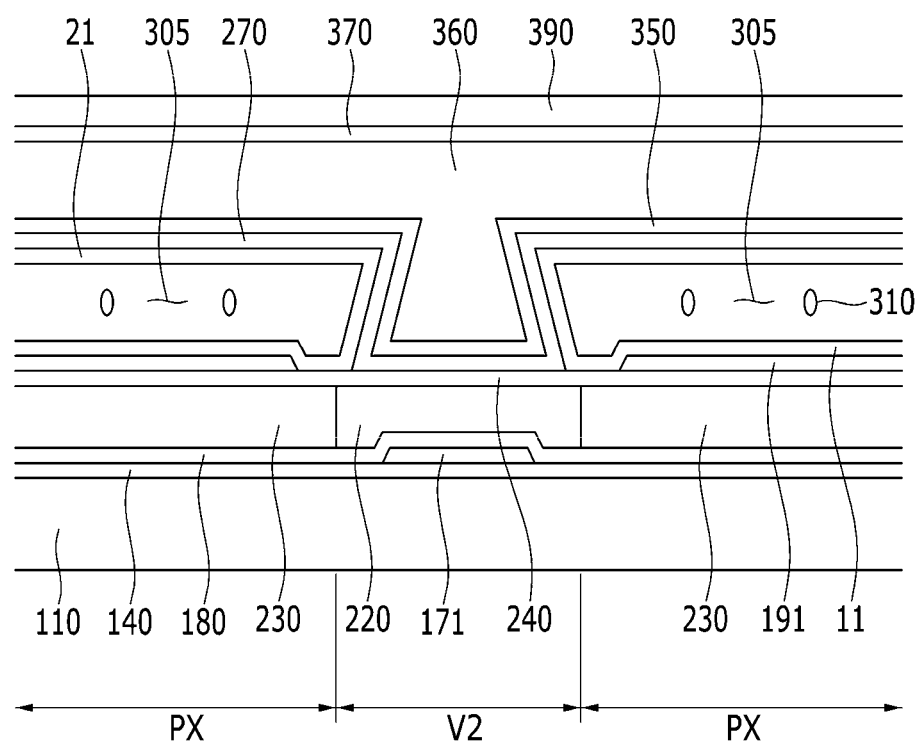
FIG. 4 is a cross-sectional view illustrating a part of the display device of FIG. 1 taken along line IV-IV according to the exemplary embodiment of the inventive concept.

FIG. 2 is a plan view illustrating one pixel of the display device according to the exemplary embodiment of the inventive concept, FIG. 3 is a cross-sectional view illustrating a part of the display device taken along line III-III of FIG. 1 according to the exemplary embodiment of the inventive concept, and FIG. 4 is a cross-sectional view illustrating a part of the display device taken along line IV-IV of FIG. 1 according to the exemplary embodiment of the inventive concept.

Referring to FIGS. 1 to 4, a plurality of gate conductors including a plurality of gate lines 121, a plurality of step-down gate lines 123, and a plurality of storage electrode lines 131 is formed on the substrate 110.

The gate lines 121 and the step-down gate lines 123 mainly extend in a horizontal direction to transfer gate signals. The gate conductor further includes a first gate electrode 124h and a second gate electrode 124l protruding upward and downward from the gate line 121, and further includes a third gate electrode 124c protruding upward from the step-down gate line 123. The first gate electrode 124h and the second gate electrode 124l are connected with each other to form one protrusion. In this case, the protrusion shape of the first, second, and third gate electrodes 124h, 124l, and 124c may be modified.

The storage electrode line 131 mainly extends in a horizontal direction to transfer a predetermined voltage such as a common voltage Vcom. The storage electrode line 131 includes storage electrodes 129 protruding upward and downward, a pair of vertical portions 134 extending downward to be substantially vertical to the gate line 121, and a horizontal portion 127 connecting ends of the pair of vertical portions 134. The horizontal portion 127 includes a capacitor electrode 137 expanded downward.

A gate insulating layer 140 is formed on the gate conductor 121, 123, 124h, 124l, 124c, and 131. The gate insulating layer 140 may be made of an inorganic insulating material such as silicon nitride (SiNx) and silicon oxide (SiOx). Further, the gate insulating layer 140 may be a single layer or a multiple layer.

A first semiconductor 154h, a second semiconductor 154l, and a third semiconductor 154c are formed on the gate insulating layer 140. The first semiconductor 154h may be disposed on the first gate electrode 124h, the second semiconductor 154l may be disposed on the second gate electrode 124l, and the third semiconductor 154c may be disposed on the third gate electrode 124c. The first semiconductor 154h and the second semiconductor 154l may be connected to each other, and the second semiconductor 154l and the third semiconductor 154c may be connected to each other. Further, the first semiconductor 154h may extend to the lower portion of the data line 171. The first to third semiconductors 154h, 154l, and 154c may be made of amorphous silicon, polycrystalline silicon, oxide semiconductor, and the like.

Ohmic contacts (not illustrated) may be further formed on the first to third semiconductors 154h, 154l, and 154c. The ohmic contact may be made of silicide or a material such as n+ hydrogenated amorphous silicon in which an n-type impurity is doped at high concentration.

A data conductor including a data line 171, a first source electrode 173h, a second source electrode 173l, a third source electrode 173c, a first drain electrode 175h, a second drain electrode 175l, and a third drain electrode 175c is formed on the first to third semiconductors 154h, 154l, and 154c.

The data line 171 transfers a data signal and mainly extends in a vertical direction to cross the gate line 121 and the step-down gate line 123. Each data line 171 extends toward the first gate electrode 124h and the second gate electrode 124l and includes a first source electrode 173h and a second source electrode 173l which are connected with each other.

Each of the first drain electrode 175h, the second drain electrode 175l, and the third drain electrode 175c includes one wide end portion and the other rod-shaped end portion. The rod-shaped end portions of the first drain electrode 175h and the second drain electrode 175l are partially surrounded by the first source electrode 173h and the second source electrode 173l. One wide end portion of the second drain electrode 175l again extends to form a third source electrode 175c having 'U'-lettered shape. A wide end portion 177c of the third drain electrode 173c overlaps the capacitor electrode 137 to form a step-down capacitor Cstd, and the rod-shaped end portion is partially surrounded by the third source electrode 175c.

The first gate electrode 124h, the first source electrode 173h, and the first drain electrode 175h form a first thin film transistor Qh together with the first semiconductor 154h, the second gate electrode 124l, the second source electrode 173l, and the second drain electrode 175l form a second thin film transistor Ql together with the second semiconductor 154l, and the third gate electrode 124c, the third source electrode 173c, and the third drain electrode 175c form the third thin film transistor Qc together with the third semiconductor 154c.

The first semiconductor 154h, the second semiconductor 154l, and the third semiconductor 154c are connected to each other to form in a stripe shape, and may have substantially the same planar shape as the data conductors 171, 173h, 173l, 173c, 175h, 175l, and 175c and the ohmic contacts therebelow, except for channel regions between the source electrodes 173h, 173l, and 173c and the drain electrodes 175h, 173l, and 175c.

In the first semiconductor 154h, an exposed portion which is not covered by the first source electrode 173h and the first drain electrode 175h is disposed between the first source electrode 173h and the first drain electrode 175h. In the second semiconductor 154l, an exposed portion which is not covered by the second source electrode 173l and the second drain electrode 175l is disposed between the second source electrode 173l and the second drain electrode 175l. In addition, in the third semiconductor 154c, an exposed portion which is not covered by the third source electrode 173c and the third drain electrode 175c is disposed between the third source electrode 173c and the third drain electrode 175c.

A passivation layer 180 is formed on the data conductor 171, 173h, 173l, 173c, 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed in a single layer or a multiple layer.

A color filter 230 in each pixel area PX is formed on the passivation layer 180. Each color filter 230 may display one of primary colors such as three primary colors of red, green and blue. However, the color filter 230 is not limited to the three primary colors of red, green and blue, but may display cyan, magenta, yellow, and white-based colors. Unlike those illustrated above, the color filter 230 may be elongated in a column direction along a space between the adjacent data lines 171.

A light blocking member 220 is formed in a region between the adjacent color filters 230. The light blocking member 220 is formed on a boundary of the pixel area PX and the thin film transistor to prevent light leakage. The color filter 230 is formed in each of the first subpixel area PXa and the second subpixel area PXb, and the light blocking member 220 may be formed between the first subpixel area PXa and the second subpixel area PXb.

The light blocking member 220 includes a horizontal light blocking member 220a which extends along the gate line 121 and the step-down gate line 123 to be expanded upward and downward, and covers regions in which the first thin film transistor Qh, the second thin film transistor Ql, and the third thin film transistor Qc are disposed, and a vertical light blocking member 220b which extends along the data line 171. That is, the horizontal light blocking member 220a may be formed at the first valley V1, and the vertical light blocking member 220b may be formed at the second valley V2. The color filter 230 and the light blocking member 220 may partially overlap with each other.

A first insulating layer 240 may be further formed on the color filter 230 and the light blocking member 220. The first insulating layer 240 may be made of an inorganic insulating material such as silicon nitride (SiNx), silicon oxide (SiOx), and silicon oxynitride (SiOxNy). The first insulating layer 240 serves to protect the color filter 230 made of the organic material and the light blocking member 220, and may be omitted if necessary.

In the first insulating layer 240, the light blocking member 220, and the passivation layer 180, a plurality of first contact holes 185h and a plurality of second contact holes 185l, which expose the wide end portion of the first drain electrode 175h and the wide end portion of the second drain electrode 175l, respectively, are formed.

A pixel electrode 191 is formed on the first insulating layer 240. The pixel electrode 191 may be made of a transparent metal material such as indium tin oxide (ITO) and indium zinc oxide (IZO).

The pixel electrode 191 includes the first subpixel electrode 191h and the second subpixel electrode 191l which are separated from each other with the gate line 121 and the step-down gate line 123 therebetween, and are disposed above and below the pixel area PX based on the gate line 121 and the step-down gate line 123 to be adjacent to each other in a column direction. That is, the first subpixel electrode 191h and the second subpixel electrode 191l are separated from each other with the first valley V1 disposed therebetween, the first subpixel electrode 191h is disposed in the first subpixel area PXa, and the second subpixel electrode 191l is disposed in the second subpixel area PXb.

The first subpixel electrode 191h and the second subpixel electrode 191l are connected with the first drain electrode 175h and the second drain electrode 175l through the first contact hole 185h and the second contact hole 185l, respectively. Accordingly, when the first thin film transistor Qh and the second thin film transistor Ql are turned on, the first thin film transistor Qh and the second thin film transistor Ql receive data voltages from the first drain electrode 175h and the second drain electrode 175l.

An overall shape of each of the subpixel electrode 191h and the second subpixel electrode 191l is a quadrangle, and the first subpixel electrode 191h and the second subpixel electrode 191l include cross stems including horizontal stems 193h and 193l and vertical stems 192h and 192l crossing the horizontal stems 193h and 193l, respectively. Further, the first subpixel electrode 191h and the second subpixel electrode 191l include a plurality of minute branches 194h and 194l, and protrusions 197h and 197l protruding downward or upward from edge of the subpixel electrodes 194h and 194l, respectively.

The pixel electrode 191 is divided into four subregions by the horizontal stems 193h and 193l and the vertical stems 192h and 192l. The minute branches 194h and 194l obliquely extend from the horizontal stems 193h and 193l and the vertical stems 192h and 192l, and the extending direction may form an angle of approximately 45 degrees or 135 degrees with the gate line 121 or the horizontal stems 193h and 193l. Further, directions in which the minute branches 194h and 194l of the two adjacent subregions extend may be perpendicular to each other.

In the exemplary embodiment, the first subpixel electrode 191h further includes an outer stem surrounding the outside, and the second subpixel electrode 191l includes horizontal portions disposed at an upper end and a lower end, and left and right vertical portions 198 disposed at the left and the right of the first subpixel electrode 191h. The left and right vertical portions 198 may prevent capacitive coupling that is coupling between the data line 171 and the first subpixel electrode 191h.

The layout form of the pixel area, the structure of the thin film transistor, and the shape of the pixel electrode described above are just an example, and the inventive concept is not limited thereto and may be variously modified.

A common electrode 270 is formed on the pixel electrode 191 so as to be spaced apart from the pixel electrode 191 at a predetermined distance. A microcavity 305 is formed between the pixel electrode 191 and the common electrode 270. That is, the microcavity 305 is surrounded by the pixel electrode 191 and the common electrode 270.

Referring to FIG. 4, in an exemplary embodiment of the inventive concept, a microcavity 305 corresponding to one pixel electrode and one common electrode has a trapezoid shape in which a length of a lower side is smaller than a length of an upper side. That is, the microcavity 305 of the display device according to the exemplary embodiment of the inventive concept has a reverse-tapered shape in which an upper width is larger than a lower width.

As such, the microcavity having the reverse-tapered shape may be formed by patterning a positive photosensitive material having the tapered shape and then coating a sacrificial layer material. A detained manufacturing method will be described below.

Figure 5:
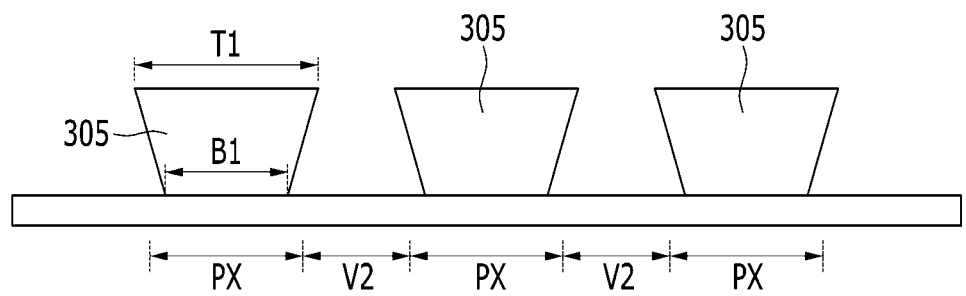
FIG. 5 schematically illustrates a cross section of the display device of FIG. 1 taken along line V-V according to the exemplary embodiment of the inventive concept.

FIG. 5 schematically illustrates a cross section of the display device of FIG. 1 taken along line V-V according to the exemplary embodiment of the inventive concept. Referring to FIG. 5, the microcavity of the display device according to the exemplary embodiment has a trapezoid shape in which a lower width B1 is smaller than an upper width T1.

Referring back to FIG. 4, the common electrode 270 may be made of a transparent metal material such as indium tin oxide (ITO) and indium zinc oxide (IZO). A predetermined voltage may be applied to the common electrode 270, and an electric field may be generated between the pixel electrode 191 and the common electrode 270.

An alignment layer 11 and 21 is formed on the pixel electrode 191 and the common electrode 270. The alignment layer 11 and 21 may also be formed directly on the first insulating layer 240 which is not covered by the pixel electrode 191.

The alignment layer 11 and 21 may be formed by vertical alignment layers, and made of alignment materials such as polyamic acid, polysiloxane, and polyimide. The alignment layers 11 and 21 may be connected to each other at an edge of the pixel area PX.

A liquid crystal layer having liquid crystal molecules 310 is formed in the microcavity 305 disposed between the pixel electrode 191 and the common electrode 270. The liquid crystal molecules 310 may have negative dielectric anisotropy, and may be aligned in a vertical direction to the substrate 110 while the electric field is not applied. That is, the liquid crystal is a vertical alignment type liquid crystal.

The first subpixel electrode 191h and the second subpixel electrode 191l generate an electric field together with the common electrode 270 to determine directions of the liquid crystal molecules 310 disposed in the microcavity 305 between the two electrodes 191 and 270. As such, luminance of light passing through the liquid crystal layer varies according to the determined directions of the liquid crystal molecules 310.

A second insulating layer 350 may be further formed on the common electrode 270. The second insulating layer 350 may be made of an inorganic insulating material such as silicon nitride (SiNx), silicon oxide (SiOx), and silicon oxynitride (SiOxNy), and may be omitted if necessary.

A roof layer 360 is formed on the second insulating layer 350. The roof layer 360 may be made of an organic material. The microcavity 305 is formed below the roof layer 360, and the roof layer 360 is hardened by a curing process to maintain the shape of the microcavity 305. That is, the roof layer 360 is formed to be spaced apart from the pixel electrode 191 with the microcavity 305 formed therebetween.

The roof layer 360 is formed in each pixel area PX along a pixel row, and is not formed in the first valley V1. That is, the roof layer 360 is not formed between the first subpixel area PXa and the second subpixel area PXb. The microcavity 305 is formed below each roof layer 360 in each of the first subpixel area PXa and the second subpixel area PXb. In the second valley V2, the microcavity 305 is not formed below the roof layer 360, but formed to be attached to the substrate 110. Accordingly, a thickness of the roof layer 360 disposed at the second valley V2 may be thicker than a thickness of the roof layer 360 disposed in each of the first subpixel area PXa and the second subpixel area PXb. The upper surface and both sides of the microcavity 305 may be covered by the roof layer 360.

An injection hole 307 exposing a part of the microcavity 305 is formed in the common electrode 270, the second insulating layer 350, and the roof layer 360. The injection holes 307 may be formed to face each other at the edges of the first subpixel area PXa and the second subpixel area PXb. That is, the injection holes 307 may correspond to the lower side of the first subpixel area PXa and the upper side of the second subpixel area PXb to expose a side of the microcavity 305. Since the microcavity 305 is exposed by the injection hole 307, an aligning agent or a liquid crystal material may be injected into the microcavity 305 through the injection hole 307.

A third insulating layer 370 may be further formed on the roof layer 360. The third insulating layer 370 may be made of an inorganic insulating material such as silicon nitride (SiNx), silicon oxide (SiOx), and silicon oxynitride (SiOxNy). The third insulating layer 370 may be formed to cover an upper surface and a side of the roof layer 360. The third insulating layer 370 serves to protect the roof layer 360 made of an organic material.

Hereinabove, the structure in which the third insulating layer 370 is formed on the roof layer 360 is described, but the inventive concept is not limited thereto, and the third insulating layer 370 may be omitted.

An overcoat 390 may be formed on the third insulating layer 370. The overcoat 390 is formed to cover the injection hole 307 by which a part of the microcavity 305 is exposed outside. That is, the overcoat 390 may seal the microcavity 305 so that the liquid crystal molecules 310 formed in the microcavity 305 are not discharged outside. Since the overcoat 390 contacts the liquid crystal molecules 310, the overcoat 390 may be made of a material which does not react with liquid crystal molecules 310. For example, the overcoat 390 may be made of parylene and the like.

The overcoat 390 may be formed as a multilayer such as a double layer and a triple layer. The double layer may comprise two layers made of different materials. The triple layer may comprise three layers, and materials of adjacent layers are different from each other. For example, the overcoat 390 may include a layer made of an organic insulating material and a layer made of an inorganic insulating material.

Although not illustrated, polarizers may be further disposed on upper and lower sides of the display device. The polarizers may include a first polarizer and a second polarizer. The first polarizer may be attached onto the lower side of the substrate 110, and the second polarizer may be attached onto the overcoat 390.

Then, a manufacturing method of a display device according to another exemplary embodiment of the inventive concept will be described with reference to FIGS. 2, and 6 to 18. FIGS. 6 to 18 illustrate a manufacturing method of a display device according to another exemplary embodiment of the inventive concept.

Figure 6:
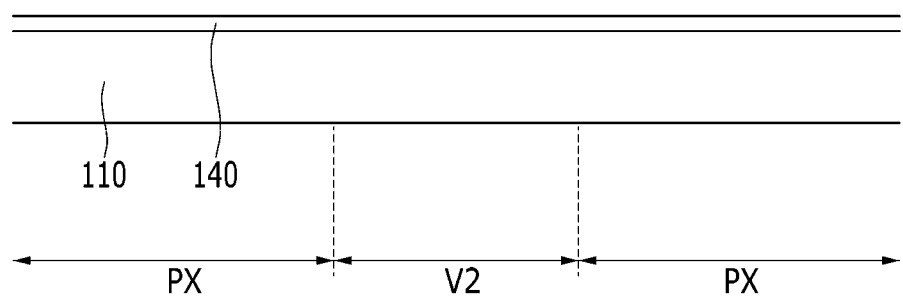
FIGS. 6 to 18 illustrate a manufacturing method of a display device according to an exemplary embodiment of the inventive concept in stages.

First, as illustrated in FIGS. 2 and 6, on a substrate 110 made of glass or plastic, a gate line 121 and a step-down gate line 123 extending in one direction are formed, and a first gate electrode 124h, a second gate electrode 124l, and a third gate electrode 124c which protrude from the gate line 121 are formed.

Further, a storage electrode line 131 may be formed together so as to be spaced apart from the gate line 121, the step-down gate line 123, and the first to third gate electrodes 124h, 124l, and 124c.

Next, a gate insulating layer 140 is formed on the entire surface of the substrate 110 including the gate line 121, the step-down gate line 123, the first to third gate electrodes 124h, 124l, and 124c, and the storage electrode line 131 by using an inorganic insulating material such as silicon oxide (SiOx) or silicon nitride (SiNx). The gate insulating layer 140 may be formed as a single layer or a multiple layer.

Next, a first semiconductor 154h, a second semiconductor 154l, and a third semiconductor 154c are formed by depositing a semiconductor material such as amorphous silicon, polycrystalline silicon, and metal oxide on the gate insulating layer 140 and then patterning the deposited semiconductor material. The first semiconductor 154h may be disposed on the first gate electrode 124h, the second semiconductor 154l may be disposed on the second gate electrode 124l, and the third semiconductor 154c may be disposed on the third gate electrode 124c.

Figure 7:
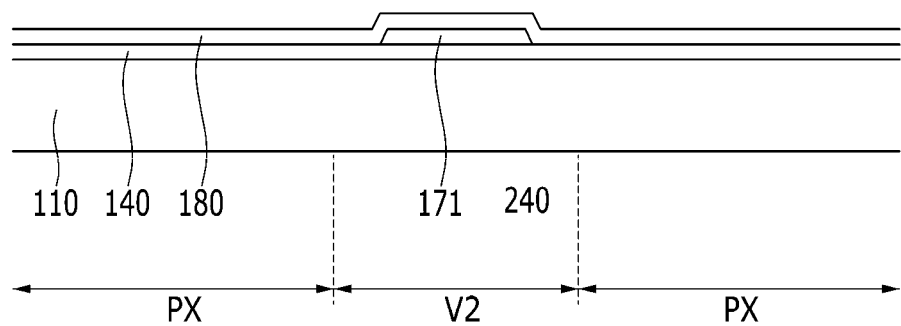
Figure 8:
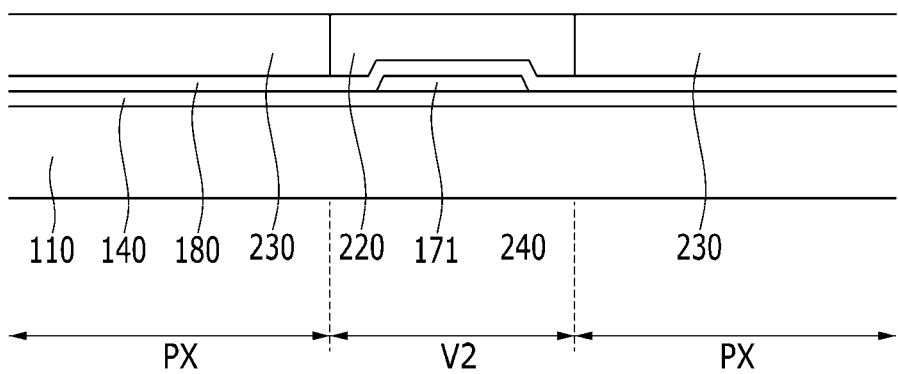

Next, referring to FIGS. 2 and 7, a data line 171 extending in the other direction substantially perpendicular to the first direction is formed by depositing a metal material and then patterning the deposited metal material. The metal material may be formed as a single layer or a multiple layer.

Further, a first source electrode 173h protruding above the first gate electrode 124h from the data line 171, and a first drain electrode 175h spaced apart from the first source electrode 173h are formed together. Further, a second source electrode 173l connected with the first source electrode 173h, and a second drain electrode 175l spaced apart from the second source electrode 173l are formed together. Further, a third source electrode 173c extended from the second drain electrode 175l, and a third drain electrode 175c spaced apart from the third source electrode 173c are formed together.

The first to third semiconductors 154h, 154l, and 154c, the data line 171, the first to third source electrodes 173h, 173l, and 173c, and the first to third drain electrodes 175h, 175l, and 175c may be formed by sequentially depositing a semiconductor material and a metal material and then patterning the semiconductor material and the metal material at the same time. In this case, the first semiconductor 154h may be extended to the lower portion of the data line 171.

The first/second/third gate electrodes 124h/124l/124c, the first/second/third source electrodes 173h/173l/173c, and the first/second/third drain electrodes 175h/175l/175c form first/ second/third thin film transistors (TFTs) Qh/Ql/Qc together with the first/second/third semiconductors 154h/154l/154c, respectively.

Next, a passivation layer 180 is formed on the data line 171, the first to third source electrodes 173h, 173l, and 173c, the first to third drain electrodes 175h, 175l, and 175c and the semiconductors 154h, 154l, and 154c exposed between the respective source electrodes 173h/173l/173c and the respective drain electrodes 175h/175l/175c. The passivation layer 180 may be made of an organic insulating material or an inorganic insulating material, and may be formed in a single layer or a multiple layer.

Next, referring to 2 and 8, a color filter 230 is formed in each pixel area PX on the passivation layer 180. The color filter 230 is formed in each of the first subpixel area PXa and the second subpixel area PXb, and may not be formed at the first valley V1. Further, the color filters 230 having the same color may be formed in a column direction of the plurality of pixel areas PX. In the case of forming the color filters 230 having three colors, a first colored color filter 230 may be first formed and then a second colored color filter 230 may be formed by shifting a mask. Next, the second colored color filter 230 may be formed and then a third colored color filter may be formed by shifting a mask.

Next, a light blocking member 220 is formed on a boundary of each pixel area PX on the passivation layer 180 and the thin film transistor. The light blocking member 220 may be formed even at the first valley V1 disposed between the first subpixel area PXa and the second subpixel area PXb.

Hereinabove, the light blocking member 220 is formed after forming the color filters 230, but the inventive concept is not limited thereto, and the light blocking member 220 is first formed and then the color filters 230 may be formed.

Figure 9:
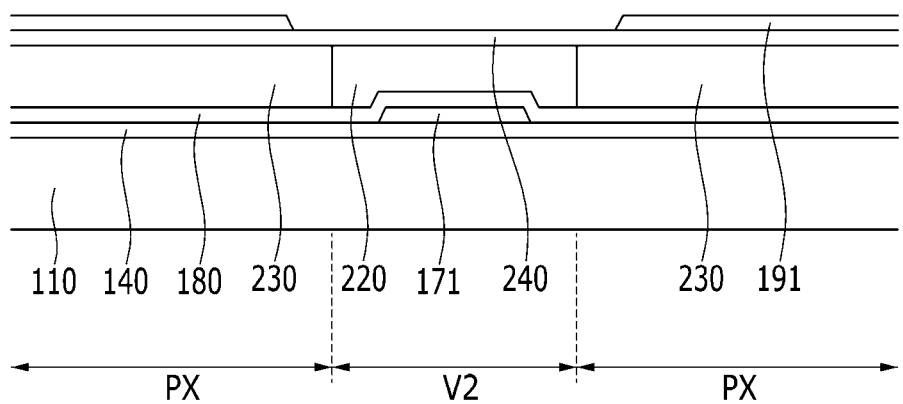

Next, referring to FIGS. 2 and 9, a first insulating layer 240 made of an inorganic insulating material such as silicon nitride (SiNx), silicon oxide (SiOx), and silicon oxynitride (SiOxNy) is formed on the color filter 230 and the light blocking member 220.

Next, a first contact hole 185h is formed by etching the passivation layer 180, the first light blocking member 220, and the first insulating layer 240 so as to expose a part of the first drain electrode 175h, and a second contact hole 185l is formed so as to expose a part of the second drain electrode 175l.

Next, a first subpixel electrode 191h is formed in the first subpixel area PXa, and a second subpixel electrode 191l is formed in the second subpixel area PXb, by depositing and patterning a transparent metal material such as indium tin oxide (ITO) and indium zinc oxide (IZO) on the first insulating layer 240. The first subpixel electrode 191h and the second subpixel electrode 191l are separated from each other with the first valley V1 therebetween. The first subpixel electrode 191h is connected to the first drain electrode 175h through the first contact hole 185h, and the second subpixel electrode 191l is connected to the second drain electrode 175l through the second contact hole 185l.

Horizontal stems 193h and 193l, and vertical stems 192h and 192l crossing the horizontal stems 193h and 193l are formed in the first subpixel electrode 191h and the second subpixel electrode 191l, respectively. Further, a plurality of minute branches 194h and 194l, which obliquely extend from the horizontal stems 193h and 193l and the vertical stems 192h and 192l, is formed.

Figure 10:
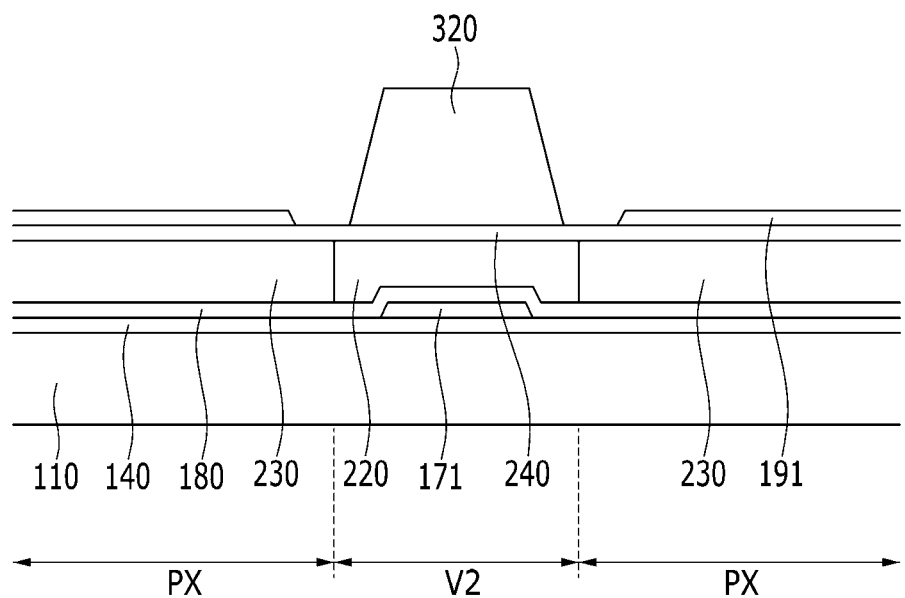

Next, referring to FIG. 10, a photosensitive material is coated on the pixel electrode, and then a tapered photo-resist pattern 320 is formed on the second valley region through a photolithography process. The photo-resist pattern may have a wide bottom portion and a narrow top portion. The photo-resist pattern may have a trapezoid shape having the wide bottom portion and the narrow top portion. That is, a trapezoid pattern having a tapered shape is formed along a data line. In this case, the trapezoid pattern may be made of a positive photosensitive material.

Figure 11:
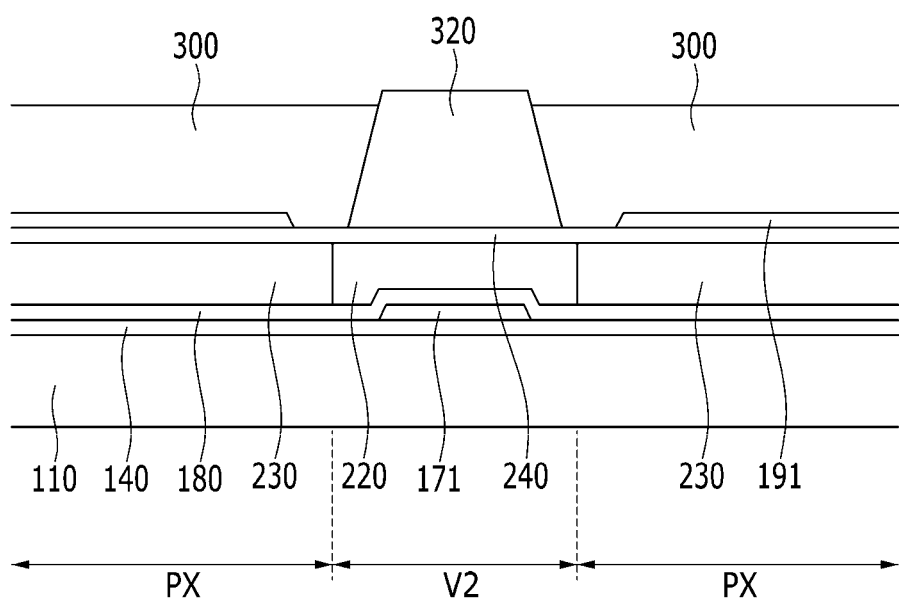

Thereafter, referring to FIG. 11, a material for forming a sacrificial layer 300 is filled between the photo-resist patterns formed in FIG. 10. If the photo-resist pattern is formed from the positive resist, the sacrificial layer 300 may be a negative photosensitive material. The sacrificial layer 300 may be formed on the pixel area PX. Since the sacrificial layer 300 is filled between the photo-resist patterns having the tapered shape formed in FIG. 10, the shape of the sacrificial layer 300 may have a reverse-tapered shape. The sacrificial layer on the trapezoid pattern may be removed. That is, a lower width of the sacrificial layer formed in one pixel PX area is smaller than an upper width of the sacrificial layer. If the photo-resist patterns have a trapezoid shape, the sacrificial layer 300 may have a reverse-tapered trapezoid shape.

Figure 12:
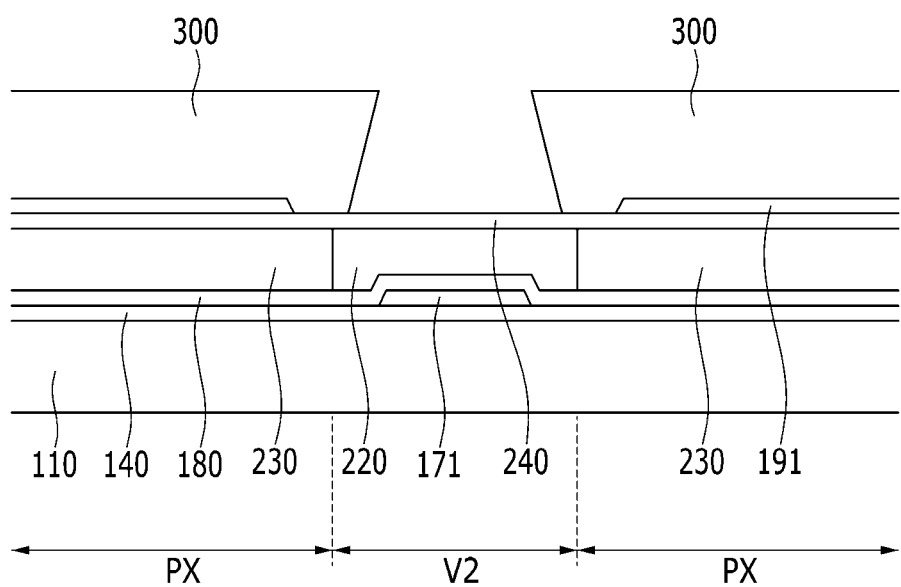

Next, referring to FIG. 12, the substrate having the photo-resist patterns and the sacrificial layer is exposed and the photo-resist pattern having the tapered shape formed in FIG. 10 is removed. Since the photo-resist pattern is made from the positive photosensitive material and the sacrificial layer is made from the negative photosensitive material, only the photo-resist pattern may be selectively removed through exposure process. Accordingly, only the sacrificial layer having the reverse-tapered shape remains on the substrate.

Accordingly, in the display device of the inventive concept, the sacrificial layer 300 having the reverse-tapered shape, for example reverse-tapered trapezoid shape, disposed on the pixel area is formed.

Figure 13:
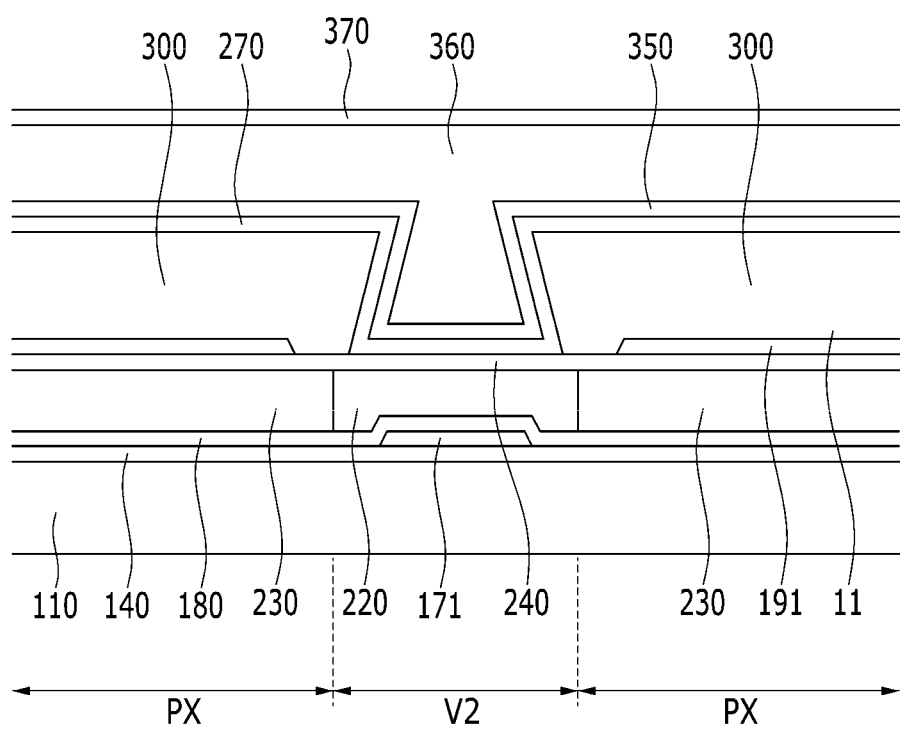

Next, as illustrated in FIG. 13, the common electrode 270 is formed by depositing a transparent metal material such as indium tin oxide (ITO) or indium zinc oxide (IZO) on the sacrificial layer 300.

The second insulating layer 350 may be formed on the common electrode 270 with an inorganic insulating material such as silicon nitride (SiNx), silicon oxide (SiOx), and silicon oxynitride (SiOxNy). Next, the roof layer 360 is formed by coating and patterning an organic material on the second insulating layer 350. In this case, referring to FIG. 1, the organic material disposed at the first valley V1 may be exposed and developed so as to be removed. The removed portion of the roof layer may serve as a liquid crystal injection hole. The roof layers 360 may be formed to be connected to each other along a plurality of pixel rows.

Next, the third insulating layer 370 may be formed on the roof layer 360 with an inorganic insulating material such as silicon nitride (SiNx) and silicon oxide (SiOx). The third insulating layer 370 is formed on the patterned roof layer 360 to cover and protect the side of the roof layer 360.

Figure 14:
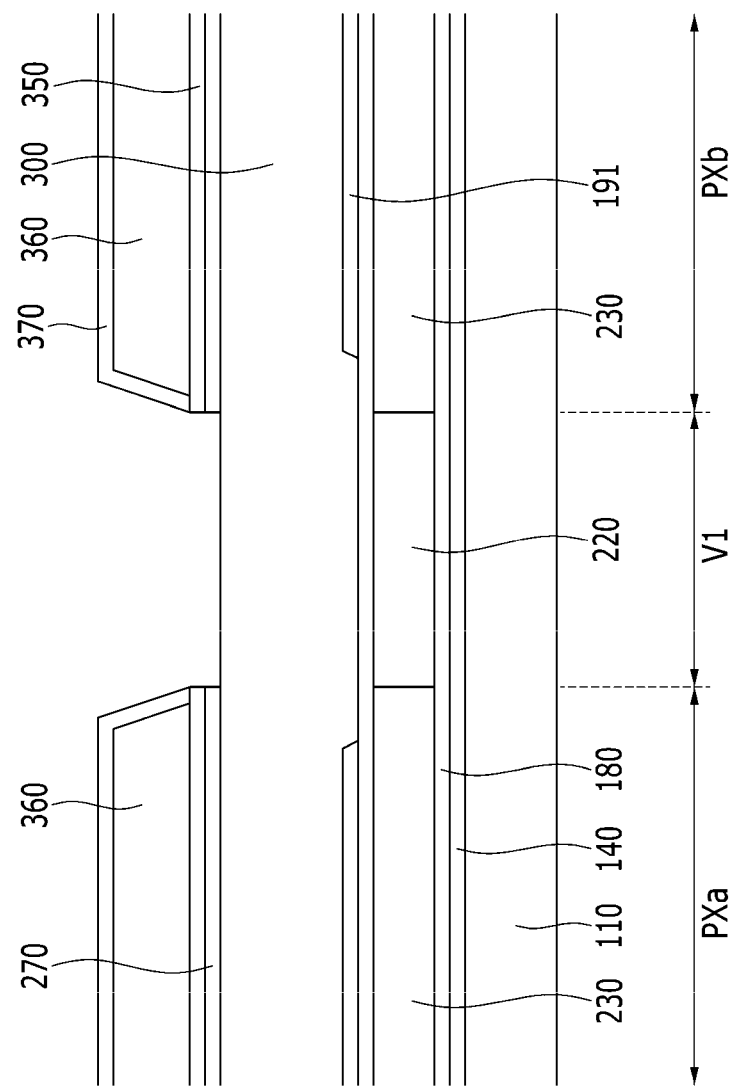

FIG. 14 illustrates another cross section of the display device manufactured by to the processes illustrated in FIG. 13. FIG. 14 illustrates a region traversing the first valley V1 region, that is, the same cross section as FIG. 3. FIG. 13 illustrates the cross section traversing the second valley V2 region, but hereinafter, for convenience of description, the cross section traversing the first valley V1 region will be described. That is, the cross sections illustrated in FIGS. 14 to 18 are the cross section at the same position as FIG. 3.

Next, as illustrated in FIG. 14, the third insulating layer 370, the second insulating layer 350, and the common electrode 270 disposed at the first valley V1 are removed by patterning the third insulating layer 370, the second insulating layer 350, and the common electrode 270. The sacrificial layer 300 disposed at the first valley V1 is exposed by patterning the third insulating layer 370, the second insulating layer 350, and the common electrode 270.

Figure 15:
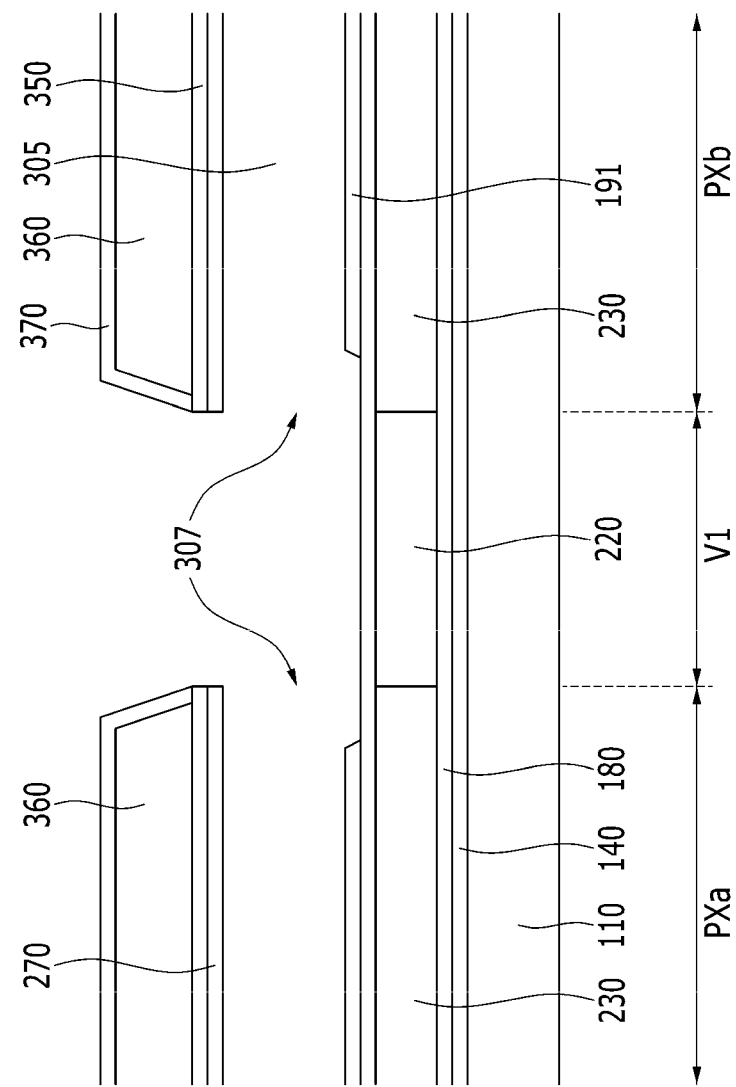

Next, referring to FIG. 15, the sacrificial layer 300 is fully removed through ashing by supplying oxygen plasma on the substrate 110 where the sacrificial layer 300 is exposed, or by supplying a developer. When the sacrificial layer 300 is removed, the microcavity 305 is generated at a region where the sacrificial layer 300 is disposed.

The pixel electrode 191 and the common electrode 270 are spaced apart from each other with the microcavity 305 therebetween, and the pixel electrode 191 and the roof layer 360 are spaced apart from each other with the microcavity 305 therebetween. The common electrode 270 and the roof layer 360 are formed to cover the upper surface and both sides of the microcavity 305.

The microcavity 305 is exposed outside through a portion where the roof layer 360 and the common electrode 270 are removed, which is called a liquid crystal injection hole 307. The liquid crystal injection hole 307 is formed along the first valley V1. Unlike this, the liquid crystal injection hole 307 may also be formed along the second valley V2.

Next, the roof layer 360 is cured by applying heat to the substrate 110. This is to maintain the shape of the space 305 by the roof layer 360.

Figure 16:
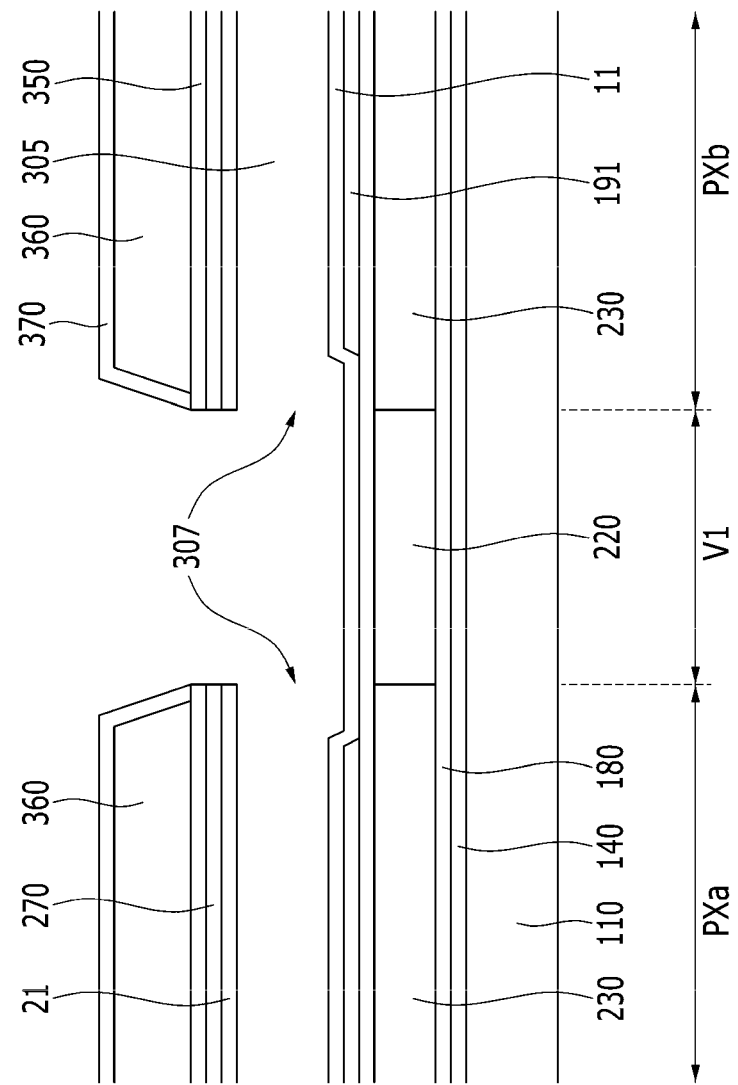

Next, referring to FIG. 16, when an aligning agent containing an alignment material is coated on the substrate 110 by a spin coating method or an inkjet method, the aligning agent is injected into the microcavity 305 through the injection hole 307. When the aligning agent is injected into the microcavity 305 and then a curing process is performed, a solvent included in the aligning agent is evaporated and the alignment layer is formed on the inner wall of the microcavity 305.

Accordingly, the alignment layer 11 and 21 may be formed on the pixel electrode 191 and the common electrode 270. The lower alignment layer 11 and the upper alignment layer 21 face each other with the microcavity 305 therebetween and are connected to each other at an edge of the pixel area PX.

In this case, the alignment layer 11 and 21 may be a vertical alignment layer. In addition, if a process of irradiating a UV to the alignment layer 11 and 21 is performed, the alignment layer 11 and 21 may be a horizontal alignment layer.

Figure 17:
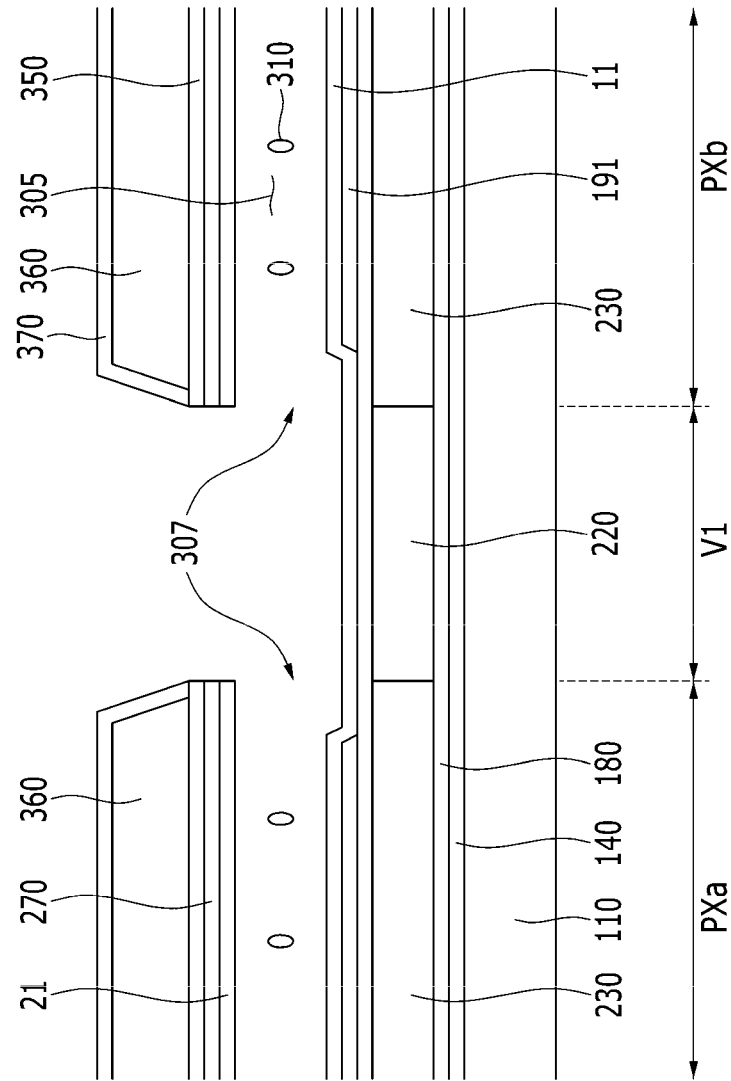

Next, referring to FIG. 17, when the liquid crystal material including liquid crystal molecules 310 is dropped or coated on the substrate 110 by an inkjet method or a dispensing method, the liquid crystal material is injected into the microcavity 305 through the injection hole 307. In this case, the liquid crystal material may be dropped in the injection holes 307 formed along the odd-numbered first valleys V1 and may not be dropped in the injection holes 307 formed along the even-numbered first valleys V1. On the contrary, the liquid crystal material may be dropped in the injection holes 307 formed along the even-numbered first valleys V1 and may not be dropped in the injection holes 307 formed along the odd-numbered first valleys V1.

When the liquid crystal material is dropped in the liquid crystal injection holes 307 formed along the odd-numbered first valleys V1, the liquid crystal material is injected into the liquid crystal injection hole 307 by capillary force to fill the microcavity 305. In this case, the liquid crystal material is injected into the microcavity 305 by discharging air in the microcavity 305 through the liquid crystal injection holes 307 formed along the even-numbered first valleys V1.

Further, the liquid crystal material may be dropped in all of the injection holes 307. That is, the liquid crystal material may be dropped in the injection holes 307 formed along the odd-numbered first valleys V1 and the injection holes 307 formed along the even-numbered first valleys V1.

Figure 18:
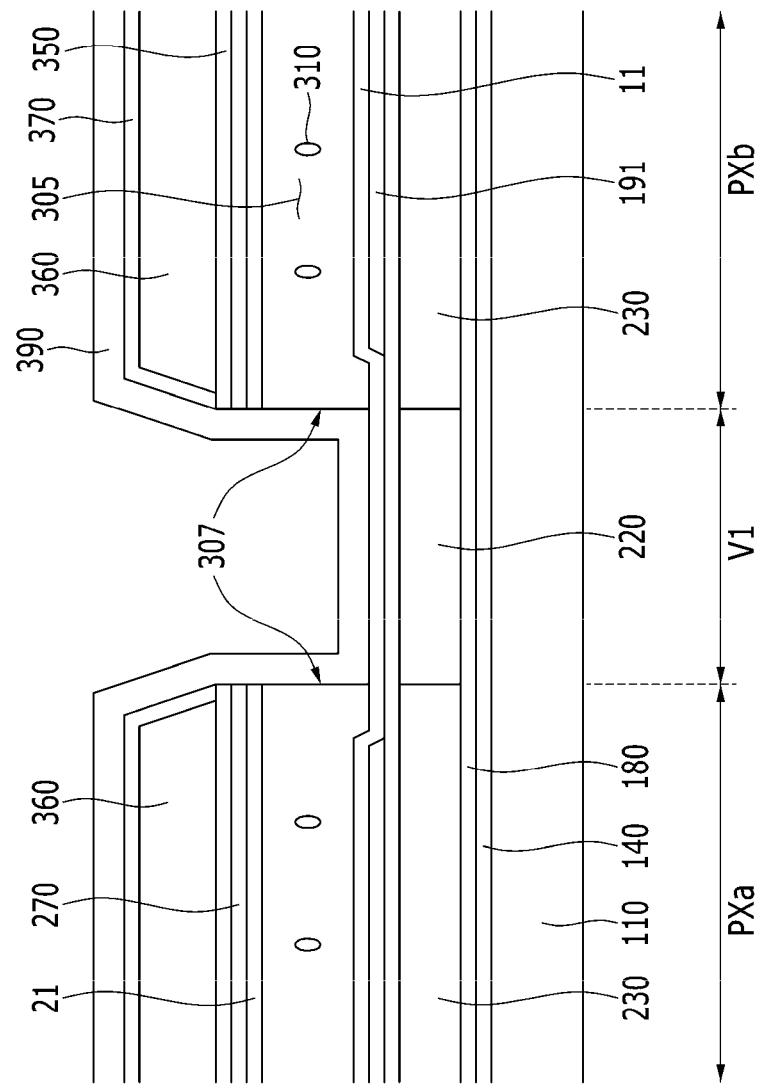

As illustrated in FIG. 18, an overcoat 390 is formed by depositing a material which does not react with the liquid crystal molecules 310 on the third insulating layer 370. The overcoat 390 is formed to cover the injection hole 307 where the microcavity 305 is exposed outside to seal the microcavity 305.

Next, although not illustrated, polarizers may be further attached onto the upper and lower surfaces of the display device. The polarizers may include a first polarizer and a second polarizer. The first polarizer may be attached onto the lower surface of the substrate 110, and the second polarizer may be attached onto the overcoat 390.

Figure 19:
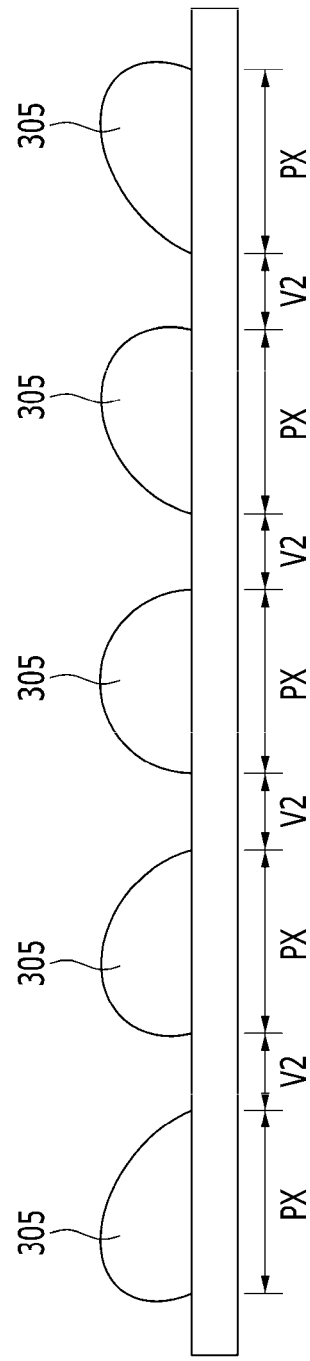
FIG. 19 schematically illustrates a cross section of the display device of FIG. 1 taken along line V-V based on a microcavity according to the exemplary embodiment of the inventive concept.

Next, another exemplary embodiment of the inventive concept will be described with reference to FIG. 19. FIG. 19 schematically illustrates a cross section of the display device of FIG. 1 taken along line V-V based on a microcavity according to the exemplary embodiment of the inventive concept. The structure and method of forming the structure for the display device according to the exemplary embodiment is similar to that of the display device according to the exemplary embodiment of FIGS. 1 to 18. The detailed description for like constituent elements is omitted.

Referring to FIG. 19, in the display device according to the exemplary embodiment, the shape of the microcavity is a semi-oval, and semi-major axis at the center and the left and right of the display device form different angles with the substrate.

Figure 20:
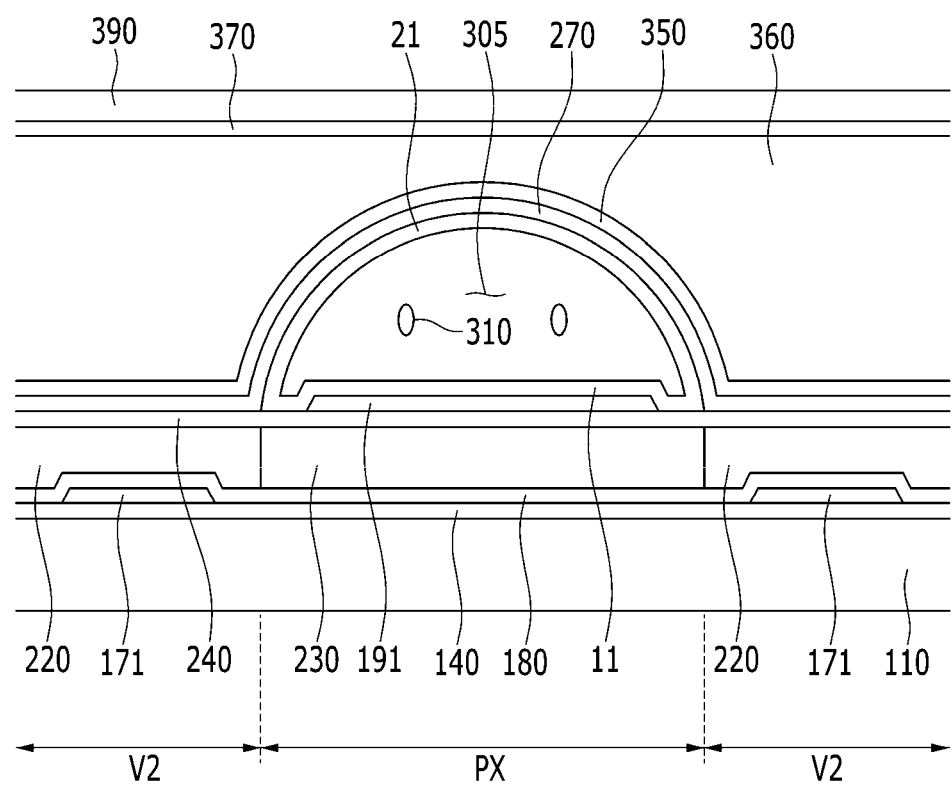
FIG. 20 illustrates a cross section of a pixel disposed at the center of the display device according to an exemplary embodiment of the inventive concept.
Figure 21:
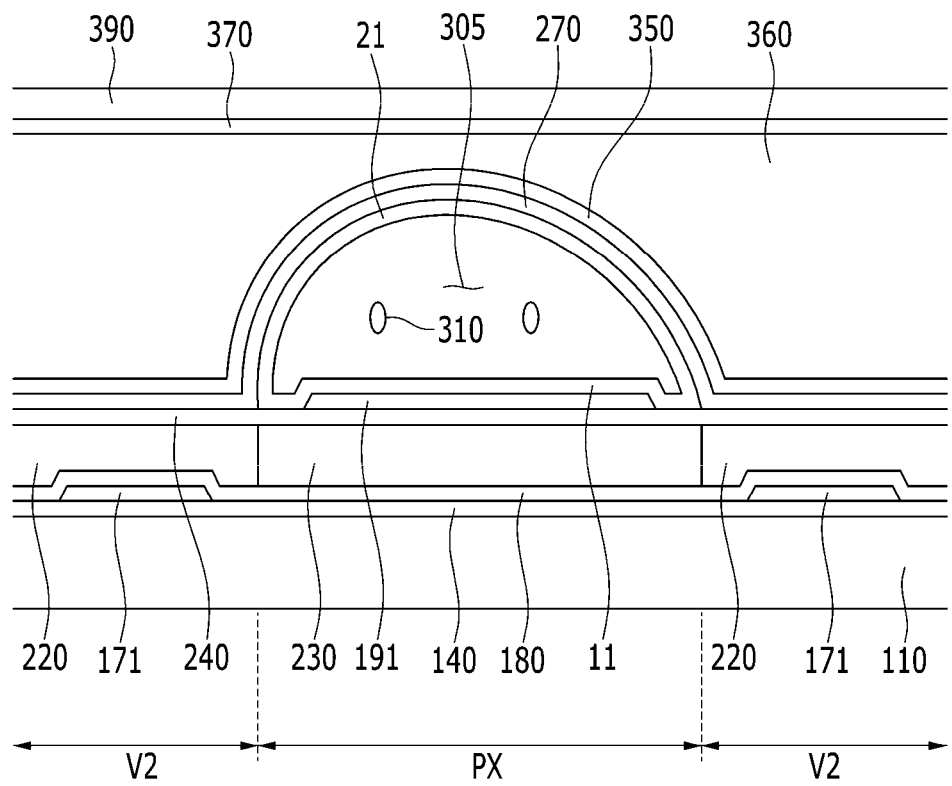
FIG. 21 illustrates a cross section of a pixel disposed at a left side of the display device according to an exemplary embodiment of the inventive concept.
Figure 22:
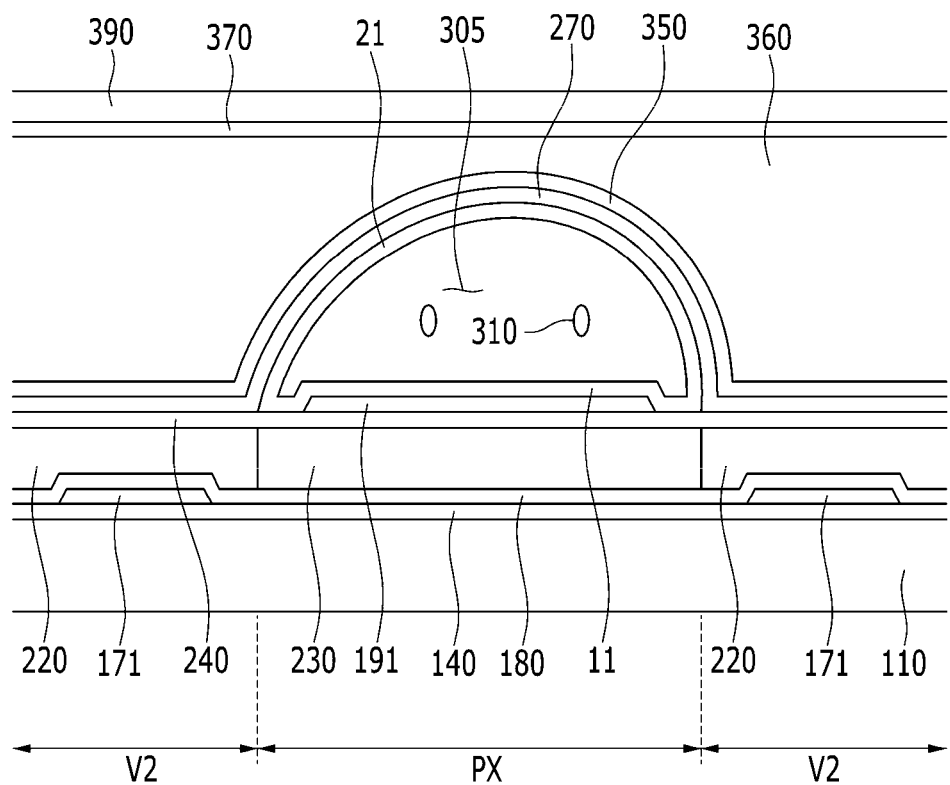
FIG. 22 illustrates a cross section of a pixel disposed at a right side of the display device according to an exemplary embodiment of the inventive concept.

FIG. 20 illustrates a cross section of a pixel disposed at a center of the display device according to the exemplary embodiment of the inventive concept, and FIG. 21 illustrates a cross section of a pixel disposed at a left side of the display device according to the exemplary embodiment of the inventive concept. FIG. 22 illustrates a cross section of a pixel disposed at a right side of the display device according to the exemplary embodiment of the inventive concept.

Referring to FIG. 20, the microcavity of the pixel disposed at the center of the display device of the inventive concept has a semi-oval shape, the semi-major axis of the semi-oval forms a right angle with the substrate. That is, the microcavity entirely has an axis of symmetry perpendicular to the substrate.

However, referring to FIG. 21, the microcavity of the pixel disposed at the left of the display device of the inventive concept has a semi-major axis inclined to the left of the display panel.

Similarly, referring to FIG. 22, the microcavity of the pixel disposed at the right of the display device of the inventive concept has a semi-major axis inclined to the right of the display panel.

Figure 23:
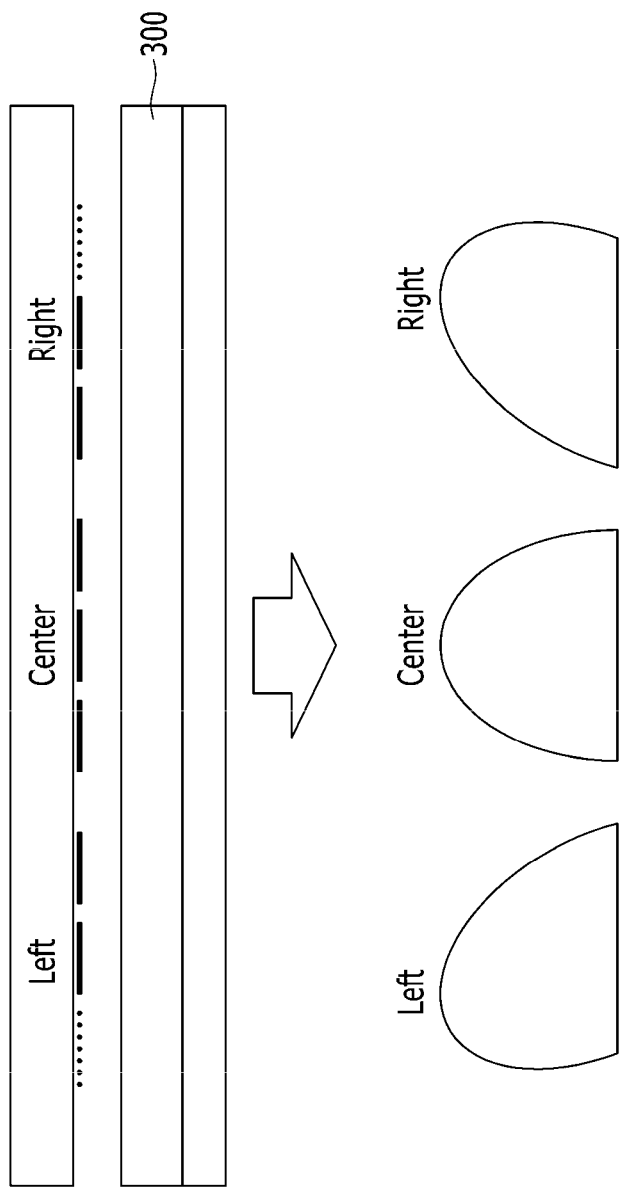
FIG. 23 illustrates a method of forming a sacrificial layer of a display device according to an exemplary embodiment of the inventive concept.

Next, a manufacturing method of the display device according to the exemplary embodiment will be described with reference to FIG. 23. FIG. 23 illustrates a method of forming a sacrificial layer of the display device according to the exemplary embodiment of the inventive concept. The manufacturing method of the display device is similar to the manufacturing method of the display device according to the exemplary embodiment of FIGS. 6 to 18. The detailed description for like constituent elements is omitted.

However, in the manufacturing method of the display device according to the exemplary embodiment, a method of forming the sacrificial layer is different. In the manufacturing method of the display device according to the exemplary embodiment, exposure for each region of the display device varies in the forming of the sacrificial layer.

In the manufacturing process, a negative photosensitive material as the sacrificial layer 300 is coated on the display device with the pixel electrode. Thereafter, a mask having the same shape illustrated in FIG. 23 is disposed on the display device.

The mask may be a halftone mask or a slit mask. The mask corresponding to a center of the substrate has a same horizontal transmittance in a left and a right side of the semi oval, and the mask except a region corresponding to the center of the substrate has a different horizontal transmittance in a left and a right side of the semi oval.

In the case where the mask is the halftone mask, transmittance is low at the central region of the entire display panel. However, in the left region of the display panel, a halftone mask in which transmittance of the left region of the semi-oval is higher than that of the right region of the semi-oval is used to expose the display panel. Similarly, in the right region of the display panel, with respect to one pixel, a halftone mask in which transmittance of the right region of the semi-oval is higher than that of the left region is used to expose the display panel.

In the case where the mask is the slit mask, a small number of slits exist in the central region of the entire display panel. However, in the left region of the display panel, the number of slits in the left region of the semi-oval is more than that of slits in the right region of the semi-oval. Similarly, in the right region of the display panel, the number of slits in the right region of the semi-oval is more than that of slits in the left region of the semi-oval.

In this case, since transmittance of the mask varies according to positions of the display panel, the photosensitive degree of the sacrificial layer material also varies.

The sacrificial layer of the pixel disposed at the center is symmetrically formed because the left and right exposure degrees are the same as each other.

However, since the sacrificial layer of the pixel disposed at the left is more exposed in the left region having high transmittance, the left region has strong resistance to development. Accordingly, the right region is more developed, and as a result, in one pixel, the left of the sacrificial layer is thicker.

Similarly, since the sacrificial layer of the pixel disposed at the right is more exposed in the right region having high transmittance, the right region has strong resistance to development. Accordingly, the left region is more developed, and as a result, in one pixel, the right of the sacrificial layer is thicker.

On the other hand, in the case of using the positive photosensitive material, transmittance of the mask may be opposite to the transmittance described above. That is, in the pixel disposed at the left of the display panel, transmittance in the left region of the semi-oval may be lower than the transmittance in the right region of the semi-oval. On the contrary, in the pixel disposed at the right of the display panel, the transmittance in the left region of the semi-oval may be higher than the transmittance in the right region of the semi-oval.

As such, as the photolithography process of the sacrificial layer is performed by using a mask having different transmittance for each region with respect to one display panel, the shape of the sacrificial layer varies according to a position of one display panel.

Referring to FIG. 19, the sacrificial layer of the pixel disposed at the center of one display panel is a symmetrical circle. However, the sacrificial layer of the pixel disposed at the left of the display panel may have a semi-major axis inclined to the left of the display panel, and the inclined degree may be increased far away from the center of the display panel. Similarly, the sacrificial layer of the pixel disposed at the right of the display panel may have a semi-major axis inclined to the right of the display panel, and the inclined degree may be increased far away from the center of the display panel. In FIGS. 19 and 23, only some pixels are illustrated as an example, but the inclination may be gradually increased according to an increase in a distance from a center of the display panel.

The sacrificial layer is removed to form a microcavity in which liquid crystal molecules are injected. Accordingly, the shape of the microcavity of the display device according to the exemplary embodiment is the same as the shape of the sacrificial layer described above.

Figure 24:
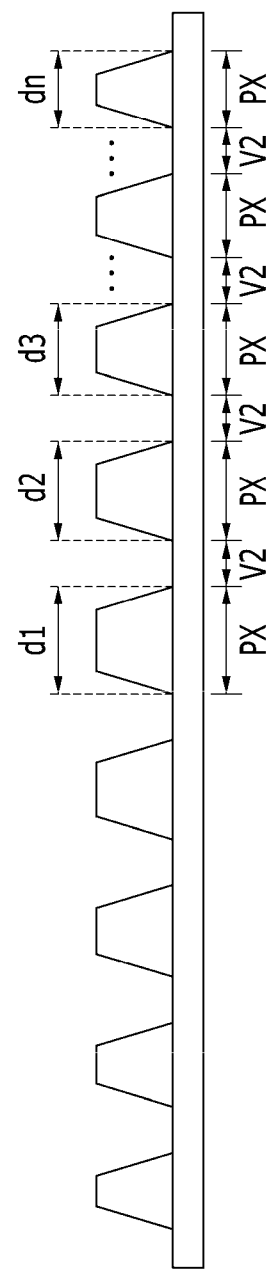
FIG. 24 schematically illustrates a cross section of the display device of FIG. 1 taken along line V-V based on a microcavity according to the exemplary embodiment of the inventive concept.

Next, a display device according to yet another exemplary embodiment of the inventive concept will be described with reference to FIG. 24. FIG. 24 schematically illustrates a cross section of the display device of FIG. 1 taken along line V-V according to the exemplary embodiment of the inventive concept. The structure for the display device according to the exemplary embodiment is similar to the structure for the display device according to the exemplary embodiment of FIGS. 1 to 18. The detailed description for like constituent elements is omitted.

However, referring to FIG. 24, in the display device according to the exemplary embodiment, the shape of the microcavity is a tapered trapezoid in which a length of a lower side is longer than a length of an upper side. Further, the width of the microcavity of the display device according to the exemplary embodiment varies according to a position of the display panel. However, the shape of the micro-cavity may be reverse-tapered trapezoid as disclosed in FIG. 5.

Referring to FIG. 24, a width dl of the microcavity of the pixel disposed at the center of the display panel is largest. However, a width of the microcavity of the pixel is gradually decreased to have a smallest width do in a pixel far away from the center of the display panel.

Referring to FIG. 24, the width of the microcavity 305 of the pixel disposed at the center is largest. However, the width of the microcavity 305 of the pixel is gradually decreased when a distance from the center from the center of the display panel is increased.

Figure 25:
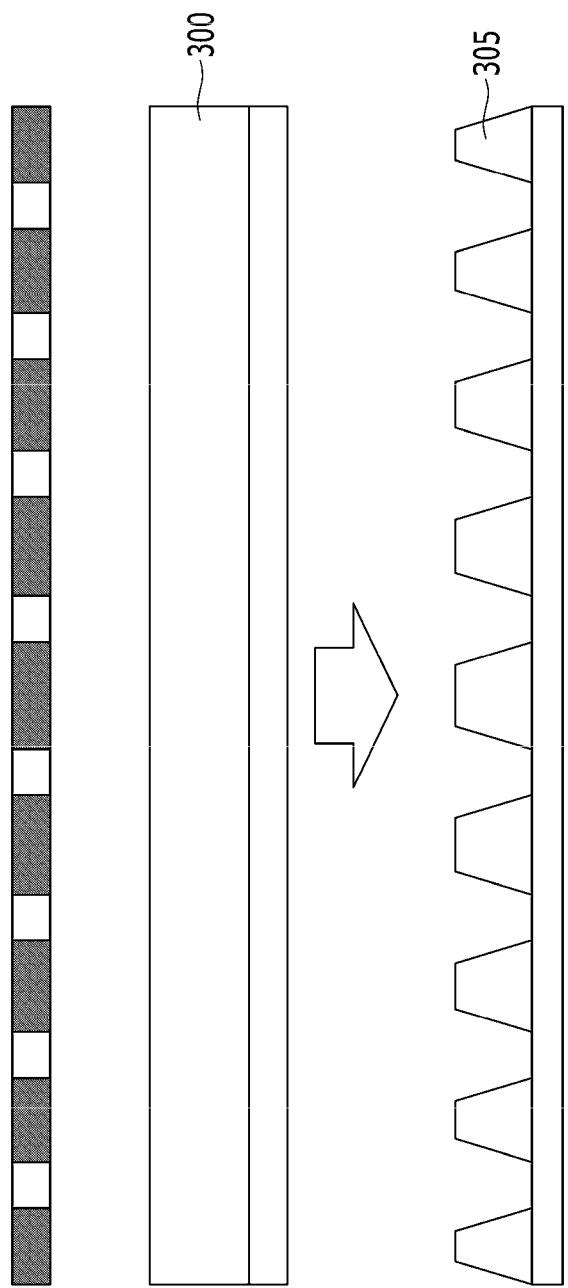
FIG. 25 illustrates a method of forming a sacrificial layer of a display device according to an exemplary embodiment of the inventive concept.

Next, a manufacturing method of the display device according to the exemplary embodiment will be described with reference to FIG. 25. FIG. 25 illustrates a method of forming a sacrificial layer of a display device according to yet another exemplary embodiment of the inventive concept.

The manufacturing method of the display device is similar to the manufacturing method of the display device according to the exemplary embodiment of FIGS. 6 to 18. The detailed description for like constituent elements is omitted.

However, in the manufacturing method of the display device according to the exemplary embodiment, a method of forming the sacrificial layer is different. In the manufacturing method of the display device according to the exemplary embodiment, a mask for forming the sacrificial layer varies for each region of the display device.

That is, referring to FIG. 25, the sacrificial layer which is a positive photo-resist is coated, and then the sacrificial layer is exposed by using a mask in which a width of a light blocking layer is gradually decreased when a distance from the center of the display panel is increased, and the sacrificial layer is developed. As the width of the mask is changed, the width of the formed sacrificial layer is changed correspondingly to the light blocking layer in the mask. When using a negative photo-resist as the sacrificial layer, a width of the light transmitting layer is gradually decreased according to an increase in distance from the center of the display panel.

Next, effects of the display device according to the exemplary embodiment of the inventive concept will be described with reference to FIGS. 26 to 28.

Figure 26:
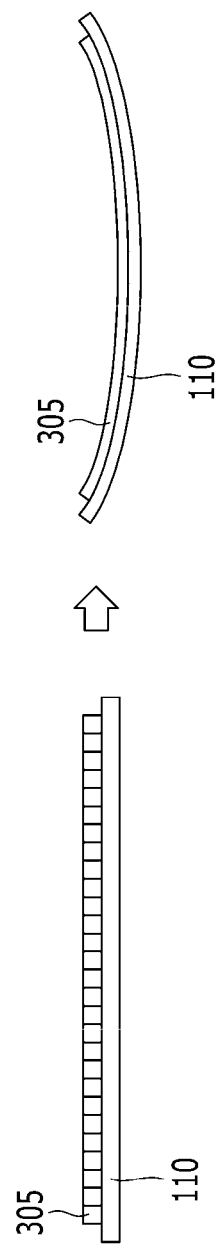
FIG. 26 illustrates bending of a panel when implementing a curved display.

FIG. 26 illustrates bending of a panel when implementing a curved display. FIG. 26 briefly illustrates only the lower substrate 110 and the microcavity 305. Referring to FIG. 26, as the panel is bending, deformation in the structure of the microcavity occurs.

Figure 27:
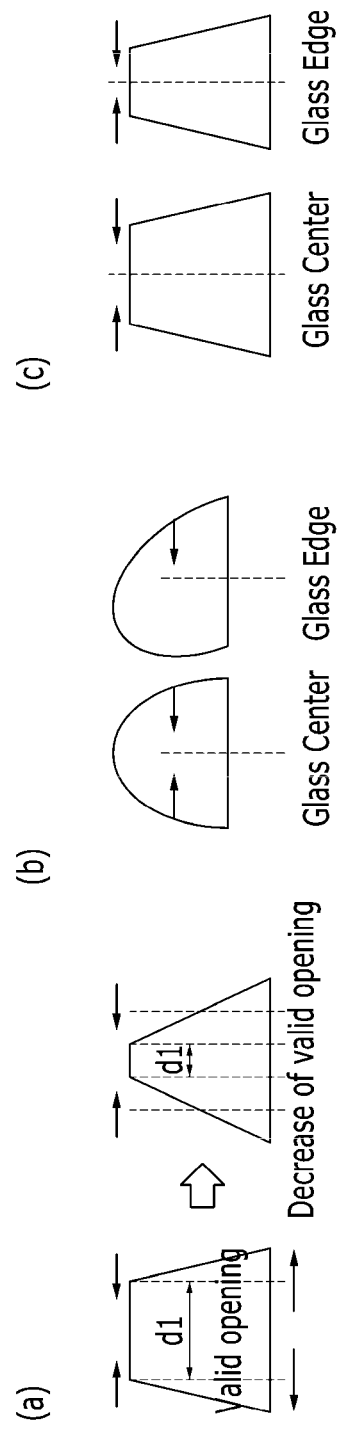
FIG. 27 illustrates deformation of a microcavity due to a bending of a panel in a display device according to Comparative Example.

FIG. 27 illustrates deformation of the microcavity due to the bending of the panel in the display device according to comparative example. FIG. 28 illustrates deformation of a microcavity due to a bending of a panel in a display device according to the exemplary embodiment.

Referring to FIG. 27A, in the microcavity having the tapered trapezoid shape, when the panel is bent, tensile stress is applied to the lower side, and compressive stress is applied to an upper side. Accordingly, the length of the lower side is increased, the width of the upper side is decreased, and a size of an effective opening D1 is decreased.

However, referring to FIG. 28A, the display device according to the embodiment of the inventive concept includes a microcavity having a reverse-tapered trapezoid shape in which the length of the upper side is larger than the length of the lower side. Accordingly, when the panel is bent, the width of the lower side is increased by tensile stress, and the width of the upper side is decreased by compressive stress. Accordingly, as illustrated in FIG. 28A, even though the panel is bent, a size of an predetermined effective opening D2 is not changed but maintained.

Further, referring to FIG. 27B, in the display device having semi-oval microcavities having the same shape in the entire panel, when the panel is bent, stress applied according to a position varies. That is, as illustrated in FIG. 27b, the microcavity disposed at the center receives the same horizontal force, but in the microcavity disposed at the right, pushing force to the left is dominant, and as a result, when the panel is bent, as illustrated in FIG. 27B, the microcavity is bent to the left.

However, referring to FIG. 28B, the microcavities disposed at the left and right regions in the panel are pre-inclined considering the force applied to the micro cavity. The microcavity disposed at the right is pre-inclined to the right in a predetermined angle. Accordingly, when the pushing force to the left is applied due to the bending of the panel, the microcavity is inclined to the left, and as a result, may maintain a symmetrical semi-oval shape. Similarly, the microcavity disposed at the left is pre-inclined to the left in a predetermined angle. Accordingly, when the pushing force to the right is applied due to the bending of the panel, the microcavity is inclined to the right and as a result, maintains a symmetrical semi-oval shape.

Further, referring to FIG. 27C, the display device according to comparative example of the inventive concept has a tapered trapezoid shape having the same size in the entire panel. However, referring to FIG. 27C, when the display device is bent, the deformation applied to the microcavity varies for each position of the panel. That is, the deformation of the microcavity disposed at the center of the display panel id dominant than the deformation of the microcavity disposed at the edge of the display panel. Accordingly, after the panel is bent, the size of the microcavity for each region varies.

However, referring to FIG. 28C, in the display device according to the exemplary embodiment of the inventive concept, a size of the microcavity varies according to a position of the panel. That is, the size of the microcavity disposed at the center of the panel is large and the size of the microcavity is gradually decreased according to a distance from the center. Accordingly, when the display panel is bent, large deformation is applied to the microcavity disposed at the center and thus the size is decreased, and the microcavity disposed at the edge has a small deformation rate. As a result, as illustrated in FIG. 28C, after the panel is bent, the sizes of the microcavities become uniform over the entire area of the panel.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
    a substrate including a plurality of pixel areas which are disposed in a matrix form including a plurality of pixel rows and a plurality of pixel columns;
    a thin film transistor formed on the substrate;
    a pixel electrode connected to the thin film transistor and formed in the pixel area;
    a common electrode formed on the pixel electrode to be spaced apart from the pixel electrode with a microcavity therebetween;
    a liquid crystal layer filling the microcavity between the pixel electrode and the common electrode;
    a roof layer formed on the common electrode;
    a liquid crystal injection hole formed in the common electrode and the roof layer to expose a part of the microcavity; and
    an overcoat formed on the roof layer so as to cover the liquid crystal injection hole to seal the microcavity,
    wherein a cross section of the microcavity has a reverse-tapered trapezoidal shape in which an upper width is larger than a lower width, and
    wherein a horizontal width of the microcavity is gradually decreased according to an increase in a distance from a center of a display panel.

2. The display device of claim 1, wherein:
    the display device is a horizontally curved display.

3. The display device of claim 1, wherein the cross section is a cross section along the pixel rows.

* * * * *